US009538484B2

(12) United States Patent
Ryu et al.

(10) Patent No.: US 9,538,484 B2
(45) Date of Patent: Jan. 3, 2017

(54) METHOD AND APPARATUS FOR CONTROLLING TRANSMISSION POWER OF DEVICE-TO-DEVICE COMMUNICATION NETWORK

(71) Applicants: Samsung Electronics Co., Ltd., Suwon-si, Gyeonggi-do (KR); Research and Business Foundation Sungkyunkwan University, Suwon-si, Gyeonggi-do (JP)

(72) Inventors: Hyun-Seok Ryu, Yongin-si (KR); Min-Young Chung, Seoul (KR); Dong-Hyun Kim, Suwon-si (KR); Sueng-Jae Bae, Suwon-si (KR); Kyung-Kyu Kim, Suwon-si (KR); Dae-Gyun Kim, Seongnam-si (KR); Seung-Hoon Park, Seoul (KR); Chi-Woo Lim, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/765,996

(22) PCT Filed: Feb. 7, 2014

(86) PCT No.: PCT/KR2014/001078
§ 371 (c)(1),
(2) Date: Aug. 5, 2015

(87) PCT Pub. No.: WO2014/123393
PCT Pub. Date: Aug. 14, 2014

(65) Prior Publication Data
US 2015/0373651 A1    Dec. 24, 2015

(30) Foreign Application Priority Data

Feb. 7, 2013 (KR) .................. 10-2013-0013855
Feb. 7, 2014 (KR) .................. 10-2014-0014472

(51) Int. Cl.
*H04W 52/24* (2009.01)
*H04W 76/02* (2009.01)
(Continued)

(52) U.S. Cl.
CPC .......... *H04W 52/245* (2013.01); *H04W 24/10* (2013.01); *H04W 52/383* (2013.01);
(Continued)

(58) Field of Classification Search
CPC .................... H04W 52/383; H04W 52/241
(Continued)

(56) References Cited

U.S. PATENT DOCUMENTS 8,140,103 B2    3/2012 Wu et al.
2003/0026219 A1*  2/2003 Moon ................ H04B 1/707
                                              370/318
(Continued)

OTHER PUBLICATIONS

Wu et al., FlashLinQ: A Synchronous Distributed Scheduler for Peer-to-Peer Ad Hoc Networks, 2010 48th Annual Allerton Conference on Communication, Control, and Computing (Allerton), pp. 1-14, Sep. 29-Oct. 1, 2010, IEEE, Piscataway, NJ, USA.

*Primary Examiner* — John J Lee
(74) *Attorney, Agent, or Firm* — Jefferson IP Law, LLP

(57) ABSTRACT

The present invention is to provide a method and device for controlling transmission power by taking comprehensive consideration not only of the effect received onto itself in each device-to-device (D2D) link of a D2D communication network but also of the effect exerted onto the neighboring links. According to an embodiment of the present invention, a processing method in a transmission terminal of a first link
(Continued)

for controlling the transmission power of the transmission terminals of links in a D2D communication network, which includes terminals of at least the first link and terminals of a second link adjacent to the first link includes: measuring the strengths of first detection signals transmitted from reception terminals of the first link and the second link; and determining a first transmission power adjustment ratio for the transmission terminal of the first link so that a signal-to-interference ratio of the second link is greater than or equal to a predetermined threshold value on the basis of the measured strengths of the first detection signals.

24 Claims, 24 Drawing Sheets

(51) Int. Cl.
  *H04W 24/10*  (2009.01)
  *H04W 52/38*  (2009.01)
  *H04W 88/04*  (2009.01)
  *H04W 84/18*  (2009.01)

(52) U.S. Cl.
  CPC ........ *H04W 76/023* (2013.01); *H04W 52/243* (2013.01); *H04W 84/18* (2013.01); *H04W 88/04* (2013.01)

(58) Field of Classification Search
  USPC .......... 455/522, 69, 452.1, 452.2, 434, 41.2, 455/41.3, 67.11
  See application file for complete search history.

(56) References Cited

U.S. PATENT DOCUMENTS

| | | |
|---|---|---|
| 2010/0261469 A1 | 10/2010 | Ribeiro et al. |
| 2010/0329186 A1 | 12/2010 | Lim et al. |
| 2012/0028672 A1 | 2/2012 | Chen et al. |
| 2012/0163252 A1 | 6/2012 | Ahn et al. |
| 2012/0190352 A1* | 7/2012 | Huang .................. H04W 24/02 455/418 |
| 2013/0324182 A1* | 12/2013 | Deng .................. H04W 52/281 455/522 |

\* cited by examiner

[1/α Table]

| 1/α | Perpetrated link (Cause Rx yielding) | | | | |
|---|---|---|---|---|---|
| | | 0 | 1 | 2 | 3 | 4 |
| Damaged link | 0 | | | | | 0.797 |
| | 1 | | 0.302 | | | |
| | 2 | | 0.013 | | 0.019 | 0.003 |
| | 3 | 0.024 | 0.440 | 0.032 | | 0.449 |
| | 4 | | | 0.999 | | |

[β Table]

| β | Perpetrated link (Cause Tx yielding) | | | | |
|---|---|---|---|---|---|
| | | 0 | 1 | 2 | 3 | 4 |
| Damaged link | 0 | | 0.560 | | 0.003 | 0.057 |
| | 1 | | | 0.038 | 0.002 | 0.055 |
| | 2 | 0.371 | | | 0.004 | 0.126 |
| | 3 | 0.100 | 0.770 | 0.002 | | |
| | 4 | | | 0.000 | 0.056 | |

For example) Value reported by link 4

FIG. 12A

[1/α Table]

| $1/α_{ij}$ | Perpetrated link(j) that can cause Rx yielding | | | | |
|---|---|---|---|---|---|
| Damaged link | | 0 | 1 | 2 | 3 | 4 |
| | 0 | | | 0.302 | | 0.797 |
| | 1 | | | 0.013 | 0.019 | 0.003 |
| | 2 | 0.024 | 0.440 | | | |
| | 3 | | | 0.032 | | 0.449 |
| | 4 | | | 0.999 | | |

$\rho_2^{Rx} = \max_k (1/α_{2k}) = 0.32$

[β Table]

| $β_{ij}$ | Perpetrated link(j) that can cause Tx yielding | | | | |
|---|---|---|---|---|---|
| Damaged link | | 0 | 1 | 2 | 3 | 4 |
| | 0 | | 0.560 | | 0.003 | 0.057 |
| | 1 | | | 0.038 | 0.002 | 0.055 |
| | 2 | 0.371 | | 0.002 | 0.004 | 0.126 |
| | 3 | 0.100 | 0.770 | 0.000 | 0.056 | |
| | 4 | | | | | |

$\rho_2^{Tx} = \max_i (1/β_{i2}) = 0.038$ $$\frac{P_{new}^{link\,2}}{P_{current}^{link\,2}} = \min(\rho_2^{Tx}, \rho_2^{Rx}) = 0.038(-14.2dB)$$

FIG. 12B

| Damaged (X) | D2D link 9 (X) | |
|---|---|---|
| Perpetrated (Y) | $1/\alpha_{9Y}$ | $1/\beta_{9Y}$ |
| 0 | 0.044213 | 1.402702 |
| 1 | 0.039467 | 0.024042 |
| 2 | 0.079655 | 798.722 |
| 3 | 14.72364 | 36.92626 |
| 4 | 9.426048 | 0.044949 |
| 5 | 1.327346 | 53.41595 |
| 6 | 0.431751 | 7.918785 |
| 7 | 0.059054 | 0.003946 |
| 8 | 0.147446 | 2.65696 |
| 9 | - | - |

Rx yielding by Current link 9   Tx yielding by Current link 9

| Perpetrated (Y) \ Damaged (X) | D2D link 9 (X) | |
|---|---|---|
| | $1/\alpha_{9Y}$ | $1/\beta_{9Y}$ |
| 0 | 0.044213 | 1.402702 |
| 1 | 0.039448 | 0.024042 |
| 2 | 0.079655 | 798.722 |
| 3 | | 36.92626 |
| 4 | | 0.044949 |
| 5 | 1.327346 | 53.41595 |
| 6 | 0.431751 | 7.918785 |
| 7 | 0.059054 | 0.003946 |
| 8 | 0.147446 | 2.65698 |
| 9 | - | - |

$$\min_{Y} \frac{1}{\beta_{9Y}} = 1.402$$

$$\beta_{9Y} = \in S_9^{Tx}$$

FIG.17B

METHOD AND APPARATUS FOR CONTROLLING TRANSMISSION POWER OF DEVICE-TO-DEVICE COMMUNICATION NETWORK

TECHNICAL FIELD

The present invention relates to a D2D communication network, and more particularly to a method and device for controlling transmission power.

BACKGROUND ART

A Device-to-Device (hereinafter referred to as 'D2D') (or Peer-to-Peer) communication network refers to a network that performs direct communication between adjacent devices without an infrastructure consisting of a centralized access point such as a base station, an Access Point (AP) or the like. In the D2D communication network, a wireless terminal identifies, on its own, geographically adjacent neighboring terminals, and if necessary, establishes a wireless link with a specific neighboring terminal and transmits data. Since this process basically has a distributed performance between terminals without the help of other devices, the D2D communication has an advantage in that rapid market introduction is possible without a separate infrastructure compared to other wireless communication networks. In addition, the D2D communication may also solve the problem of traffic overload which has currently been centered on the base station or AP by locally accommodating data traffic. For these reasons, standards organizations such as 3rd Generation Partnership Project (3GPP), Institute of Electrical and Electronics Engineers (IEEE) and the like have been promoting the establishment of D2D communication standards based on Long Term Evolution (LTE)-advanced or Wireless-Fidelity (Wi-Fi) and Qualcomm Inc., along with others have also been developing proprietary D2D communication technologies.

In the D2D communication network, terminals (or the devices) have to have a capability to form a D2D link with another terminal on their own without the assistance of a base station or AP and perform data communication through the D2D link. During the process, a distributed link scheduling method for determining when or through which wireless resources each of multiple D2D links transmits data is very important in relation to the performance of the D2D communication network. Qualcomm Inc. proposed a distributed link scheduling technique considering a Signal-to-Interference ratio (hereinafter referred to as 'SIR') between links through an Orthogonal Frequency Division Multiplexing (OFDM) signal architecture-based single-tone detection signal exchange by terminals in a synchronized wireless environment: X. Wu, S. Tabildar, S. Shakkottai, T. Richardson, J. Li, R. Laroia, and A. Jovicic. FlashLinQ: A synchronous Distributed Scheduler for Peer-to-Peer Ad Hoc Networks, Technical Report, 2010.

FlashLinQ, a wireless communication technique capable of a single-hop communication from one terminal to another terminal within a 1 (one) km radius from each other, supports a high performance D2D communication for multiple D2D links by considering the estimated amount of interference instead of considering carrier sensing in determining on which link to transmit. However, when the respective D2D links randomly transmit power in FlashLinQ, the performance of the entire D2D network may be deteriorated because a degree (level) of the transmission power control has a direct effect on the SIR-based distributed link scheduling result. Thus, a method for controlling the transmission power of each D2D link needs to be devised so as to improve the performance of the entire network in the D2D communication network using distributed link scheduling.

DETAILED DESCRIPTION OF THE INVENTION

Technical Problem

Thus, embodiments of the present invention are to provide a method and device for controlling transmission power of each D2D link in a D2D communication network.

In addition, embodiments of the present invention are to provide a method and device for controlling transmission power by taking a comprehensive consideration not only of the effect received onto itself in each device-to-device (D2D) link of a D2D communication network but also of the effect exerted onto the neighboring links.

Further, embodiments of the present invention are to provide a method and device for improving the performance of the entire network D2D by controlling the transmission power distributed for each D2D link in consideration of the effects of the degree of transmission power control in each D2D link in a D2D communication network on the SIR-based distributed link scheduling result.

Further, embodiments of the present invention are to provide a method and device for improving the performance of the entire network D2D by having a centralized control of transmission power for each D2D link in consideration of the effects of the degree of transmission power control in each D2D link in a D2D communication network on the SIR-based distributed link scheduling result.

Technical Solution

According to an embodiment of the present invention, a processing method in transmission terminals of a first link for controlling transmission power of transmission terminals of links in a D2D communication network, which includes terminals of at least the first link and terminals of a second link adjacent to the first link, the processing method includes: measuring the strengths of first detection signals transmitted from reception terminals of the first link and the second link; and determining a first transmission power adjustment ratio for the transmission terminals of the first link so that a signal-to-interference ratio of the second link is greater than or equal to a predetermined threshold value on the basis of the measured strength of the first detection signals.

According to another embodiment of the present invention, a processing method in reception terminals of a first link for controlling transmission power of transmission terminals of links in a D2D communication network, which includes terminals of at least the first link and terminals of a second link adjacent to the first link, the processing method includes: measuring the strength of detection signals transmitted from transmission terminals of the first link and the second link; and determining a first transmission power adjustment ratio for the transmission terminals of the first link so that a signal-to-interference ratio of the first link is greater than or equal to a predetermined threshold value on the basis of the measured strength of the detection signals.

According to another embodiment of the present invention, a processing method in the controller for controlling transmission power of transmission terminals of links in a D2D communication network, which includes terminals of a plurality of neighboring links and a controller, the processing method includes: receiving, from each of the transmission terminals of the links, a control message including a yield indicator so that a signal-to-interference ratio of the link itself and a signal-to-interference ratio of neighboring links are greater than or equal to a predetermined threshold value; selecting a link for transmission power adjustment from among the plurality of links; determining a transmission power adjustment ratio for the transmission terminal of the selected link using the yield indicator included in the control message; and transmitting the determined transmission power adjustment ratio to the transmission terminal of the selected link.

According to another embodiment of the present invention, a transmission terminal device of a first link for controlling transmission power of transmission terminals of links in a D2D communication network, which includes terminals of at least the first link and terminals of a second link adjacent to the first link, the device includes: a transceiver that measures the strength of first detection signals transmitted from reception terminals of the first link and the second link; and a controller that determines a first transmission power adjustment ratio for the transmission terminals of the first link so that a signal-to-interference ratio of the second link is greater than or equal to a predetermined threshold value on the basis of the measured strength of the first detection signals.

According to another embodiment of the present invention, a reception terminal device of a first link for controlling transmission power of transmission terminals of links in a D2D communication network, which includes terminals of at least the first link and terminals of a second link adjacent to the first link, the device includes: a transceiver that measures the strength of detection signals transmitted from transmission terminals of the first link and the second link; and a controller that determines a first transmission power adjustment ratio for the transmission terminals of the first link so that a signal-to-interference ratio of the first link is greater than or equal to a predetermined threshold value on the basis of the measured strength of the detection signals.

According to another embodiment of the present invention, a controller device for controlling transmission power of transmission terminals of the links in a D2D communication network, which includes terminals of a plurality of neighboring links and the controller, the device includes: a receiver that receives, from each of the transmission terminals of the links, a control message including yield indicator so that the signal-to-interference ratio of the link itself and the signal-to-interference ratio of neighboring links are greater than or equal to a predetermined threshold value; a controller that selects a link for a transmission power adjustment from among the plurality of links and determines a transmission power adjustment ratio for the transmission terminal of the selected link using the yield indicator included in the control message; and a transmitter that transmits the determined transmission power adjustment ratio to the transmission terminal of the selected link.

BRIEF DESCRIPTION OF THE DRAWINGS

For a complete understanding of the present invention and its effects, the following description will be made with reference to the accompanying drawings, and like reference numerals represent like parts, in which:

FIG. 12A shows an example of values stored in tables in the base station shown in FIG. 9, during a centralized power control operation according to an embodiment of the present invention;

FIG. 12B shows an example of calculating a power adjustment ratio from values stored in the table in the base station shown in FIG. 9 during a centralized power control operation according to an embodiment of the present invention;

FIG. 17B shows an example in which a power adjustment ratio is calculated from values stored in the table of devices shown in FIG. 14 during a power control operation according to a second embodiment of the present invention;

MODE FOR CARRYING OUT THE INVENTION

Herein, various embodiments and FIGS. 1 to 19C discussed below to be used to describe the principles of the present invention are only for an illustrative example and should not be interpreted as limiting the scope of the present invention. Those skilled in the art will appreciate that the principles of the present invention may be implemented in any of the D2D communication networks arranged appropriately.

Embodiments of the present invention which will be described below are intended to provide methods to effectively adjust the transmission power of each D2D link in a D2D communication network including wireless communications devices. According to embodiments of the present invention, two indicators, yield effect and yield degree of transmission (Tx) and reception (Rx), are defined from links to which each D2D link is adjacent. Embodiments of the present invention propose a method and device in which adjustment may be made by having the transmission power of the D2D links distributed for each link based on the two indicators or by having the transmission power of the D2D links centralized through the support of a controller such as a mobile communication base station. A power control method proposed by the embodiments of the present invention has an advantage in that the performance of the D2D network can be improved by effectively controlling the transmission power of each link in consideration of geographic and propagated relations and link scheduling effects between D2D links.

Hereinafter, firstly, distributed link scheduling in a D2D communication network to be applied to the embodiments of the present invention and the need for a new transmission power control operation in the D2D communication network that performs the distributed link scheduling will be described. Next, the yield related indicator which will be the reference of the transmission power control operation in accordance with embodiments of the present invention will be described. Next, a centralized transmission power control operation according to an embodiment of the present invention will be described. Then, a distributed transmission power control operation according to an embodiment of the present invention will be described. Finally, a performance evaluation result of a transmission power control operation in accordance with embodiments of the present invention will be described.

A. Distributed Link Scheduling

Figure 1:
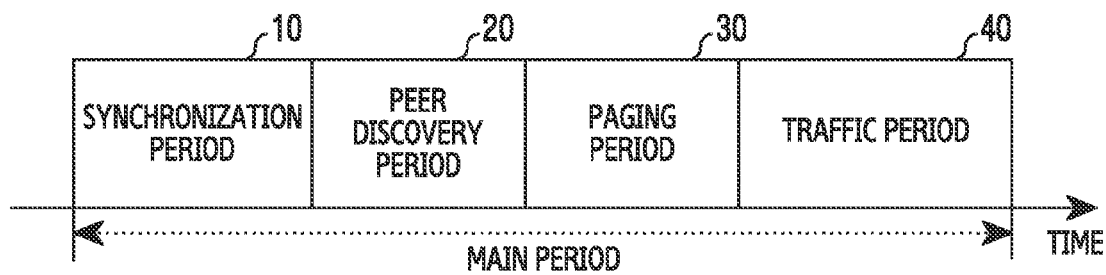
FIG. 1 shows a basic transport structure according to the distributed link scheduling method to which the present invention is applied.

According to a distributed link scheduling method, terminals form and maintain a D2D communication network by making use of distribution-limited wireless resources without the help of a base station and the like. A main transmission structure for performing this function may have a functional structure periodically repeated as shown in FIG. 1. Every cycle includes a synchronization period 10, a peer discovery period 20, a paging period 30, and a traffic period 40. In the synchronization period 10, the basic time and frequency synchronization between the terminals is performed through a Global Positioning System (GPS) and the like. In the peer discovery period 20, geographically adjacent neighboring terminals are identified through terminal information to which each terminal broadcasts. In the paging period 30, a D2D link for one-way transmission between the terminals to communicate is formed. In the traffic period 40, link scheduling and data transmission accompanied with the link scheduling are performed based on the link formed through the above processes.

Figure 2:
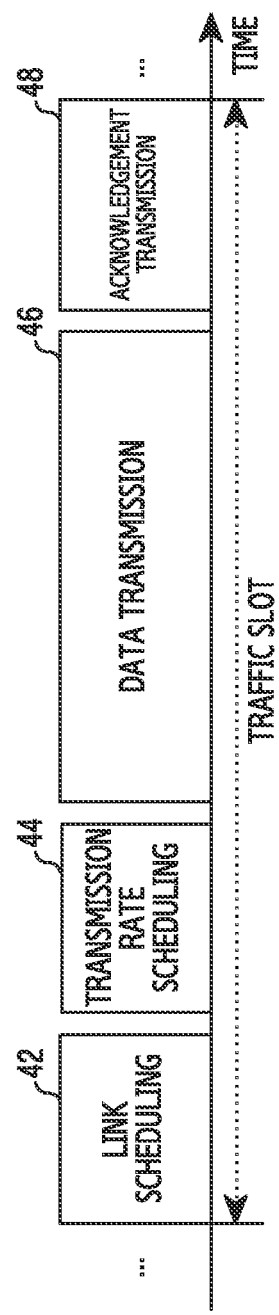
FIG. 2 shows a traffic slot structure constituting the traffic period shown in FIG. 1.

The traffic section includes a plurality of traffic slots, and independent link scheduling and data transmission are performed for each traffic slot. A traffic slot has a basic structure as shown in FIG. 2, which is divided into four sections of a link scheduling period 42, a transmission rate scheduling period 44, a data transmission period 46, and an acknowledgment transmission period 48. In the link scheduling period 42, the signal interference relation between the links is measured by transmitting a single-tone detection signal utilizing an OFDM signal structure for each D2D link for each one-way communication and data transmission availability in the traffic slot is determined. In the transmission rate scheduling period 44, detailed adjustment of the transmission rate on the links determined to transmit data in the traffic slot is performed. In the data transmission period 46, transmission terminals perform data transmission to the peer reception terminal, and an acknowledgment message for the data transmission is transmitted in the acknowledgment transmission period 48.

According to the distributed link scheduling method, in order to determine link scheduling, that is, whether to use a link, for the single-hop one-way D2D links in the link scheduling period 42 in FIG. 2, an OFDM signal structure of which wireless resources are orthogonal to each other in the time and frequency plane is defined, and through which the plurality of D2D terminals transmit single-tone detection signals at the same time without mutual signal interference. The signal-to-interference ratio (SIR) measured thus for themselves and the neighboring D2D links is calculated, and link scheduling is performed based on the calculation result.

Meanwhile, due to the nature of the wireless resources, the number of the D2D links that may use the same wireless resources at a particular time point is limited. For this reason, in the centralized wireless communication technology such as mobile communication, wireless resources used by terminals are limited by a central controller such as a base station. On the other hand, in the D2D communication of which the distributed link scheduling is performed by respective terminals, a method that can limit the occupation of the wireless resources of the link in consideration of the signal interference is required. To this end, the distributed link scheduling method allocates a Connection Identifier (CID), which is an identifier allocated to be locally unique to each link, and using this, gives a unique priority for each traffic slot. Each link determines, on the basis of these priorities, whether a communication is to be performed in the current traffic slot by considering the SIRs for the links themselves and the higher-prioritized links. The priority, in order to ensure fairness between the links, is evenly changed per every traffic slot by utilizing Hash, Pseudo Noise (PN) code, and the like.

Figure 3A:
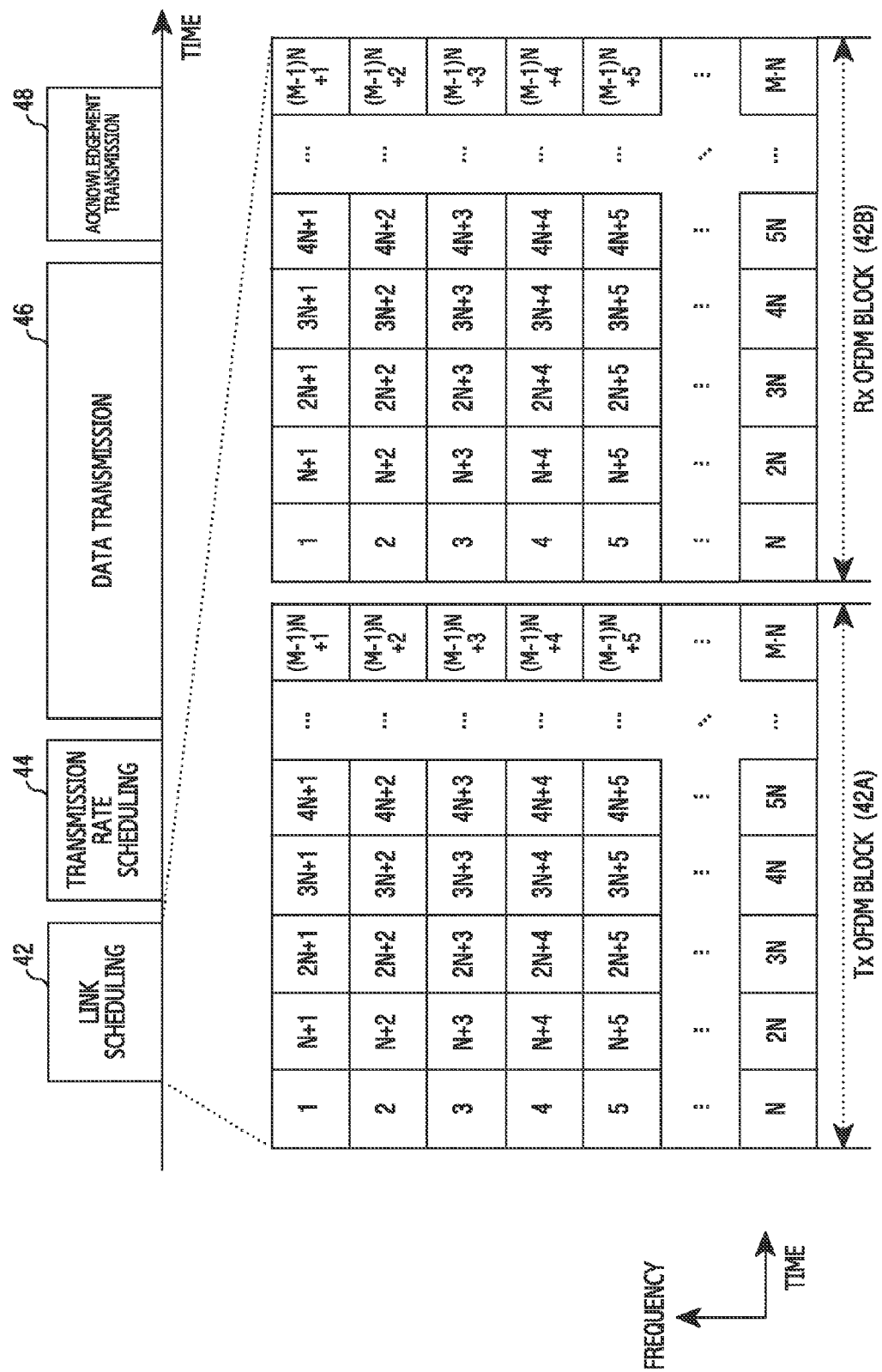
FIG. 3A shows a structure of the link scheduling period shown in FIG. 2.

In order to perform link scheduling considering the SIRs of the link itself and the higher priority links, based on the priorities, transmission/reception terminals need to know the channel state between the neighboring transmission/reception terminals. To this end, in the distributed link scheduling method, a single-tone detection signal transmission method based on the OFDM signal structure (block) shown in FIG. 3A is defined. The link scheduling period 42 includes Tx OFDM block 42A for the transmission terminal and Rx OFDM block 42B for the reception terminal. Each OFDM block is configured by N sub-carriers in the frequency plane and M OFDM symbols in the time plane, and includes a total of N·M transmission units. The N·M transmission units are prioritized from 1 to N·M in the order from the top to bottom and left to right, as shown in FIG. 3A, and each link uses resource units that match their priority for transmission and reception of single-tone detection signals. Here, the highest priority is 1 and N·M is the lowest.

A single-tone signal means a tone signal having a single sub-carrier in the frequency plane. The signal, due to the narrow frequency bandwidth, can be transmitted by a higher power compared to a multi-tone signal. The single-tone signal may have a wide communication area of a radius of 1 km by utilizing such a tone signal.

The scheduling method for the D2D links, based on the priority which is allocated to be locally only one, is performed as follows. A transmission terminal having data to send to a peer reception terminal transmits a single-tone signal through a transmission unit corresponding to its own link priority in the Tx OFDM block. The reception terminal observes the transmission unit for every traffic slot in order to receive data. If a single-tone signal from the transmission terminal is received, the reception terminal compares the interference signal strength from the link having a higher priority in signal strength from the peer transmission terminal, and determines whether the communication is possible on the link. When it is determined that the communication is possible on the link, the reception terminal transmits a single-tone signal by a transmission unit in the Rx OFDM block. The transmission terminal which has received single-tone signals from the peer reception terminal and reception terminals having higher priorities in the Rx OFDM block, when it is itself determined to inflict signal interference of equal to or less than a predetermined level to reception terminals having higher priorities, decides to perform the communication on the link.

Figure 4:
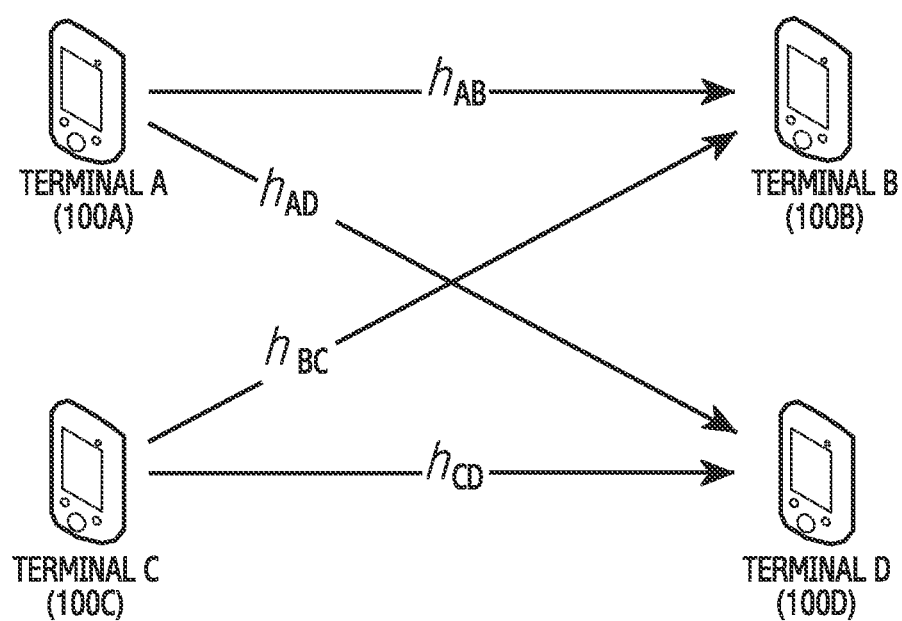
FIG. 4 shows an example of a D2D communication network for illustrating the SIR-based link scheduling operation.

An example of the link scheduling will be described with reference to FIG. 4. In this example, a procedure is considered for performing a scheduling of a link for data transmission from a terminal C 100C to a terminal D 100 D in the D2D communication network where two links co-exist as shown in FIG. 4. Here, a terminal A 100A has data to be transmitted to a terminal B 100B (link 1), the terminal C 100C has a data to be transmitted to the terminal D 100D (link 2), and it is assumed that the priority of link 1 is higher than link 2. Also, $h_{xy}$ denotes a channel gain between a terminal X and terminal Y.

The terminal A 100A and the terminal C 100C in the Tx OFDM block, transmit a single-tone signal (Direct Power Signal, hereinafter referred to as 'DPS') having transmission power of $P_A$ and $P_C$ through a transmission unit according to each priority. The reception terminal D 100D calculates an estimated signal-to-interference ratio (SIR link_2) of the link 2 according to the signal interference from the higher priority link on the basis of the DPS strength ($P_C \cdot |h_{CD}|^2$ [Watt]) received from its peer terminal (the terminal C 100C) and the DPS strength ($P_A \cdot |h_{AD}|^2$ [Watt]) received from the transmission terminal (the terminal A 100A) having a higher priority, by equation 1 as follows:

$$SIR_{link\_2} = \frac{P_C \cdot |h_{CD}|^2}{P_A \cdot |h_{AD}|^2} \quad (1)$$

If SIR link_2 is lower than the threshold value ($\gamma_{Rx}$) defined in advance, the terminal D 100D determines that communication of the link 2 may not be performed due to the strong interference from a higher transmission terminal, and may perform a reception yielding (Rx yielding).

Whereas, if the SIR is greater than $\gamma_{Rx}$, the terminal D 100D determines that communication of link 2 is possible. Terminal D 100D and terminal B 100B, through which it is determined that communication is possible, transmit single-tone signals referred to as Inverse Power Echo (IPE) through a transmission unit corresponding to the respective priority of link 2 and link 1 in the following Rx OFDM block, with the signal strength defined by equation 2 as follows.

$$P_{IPE} = \frac{K}{P_{Tx} \cdot |h_{Tx,Rx}|^2} \quad (2)$$

Where K is a constant defined by the system, PTx represents the transmission power strength of a peer transmission terminal, and hTx, Rx represents a channel gain between itself and the transmission terminal. In this example, the strengths of the IPE signal transmitted by the terminal B 100B and the terminal D 100D are K/(PA·|hAB|2) [Watt] and K/(PC·|hCD|2) [Watt], respectively. The terminal C 100C that receives the IPE signal from the terminal D 100D via a transmission unit for the link 2, determines whether the SIR effects (SIR link_1) that are expected to have effects on communication of the link 1 having a higher priority meet conditions the following equation (3), by utilizing the strength ((K·|hBC|2)/(PA·|hAB|2) [Watt]) of the IPE signal received from the terminal B 100B $$SIR_{link\_1} = \left(\frac{K \cdot |h_{BC}|^2}{P_A \cdot |h_{AB}|^2}\right)^{-1} \cdot \frac{K}{P_C} = \frac{P_A \cdot |h_{AB}|^2}{P_C \cdot |h_{BC}|^2} > \gamma_{Tx} \quad (3)$$

If the conditions are satisfied in the above equation (3), the transmission terminal 100C starts the transmission of the link 2 by transmitting a pilot signal in the subsequent transmission rate scheduling period. On the other hand, if the calculated $SIR_{link\_1}$ is smaller than a threshold value $\gamma_{Tx}$, the transmission terminal 100C determines that its data transmission has a significant impact on the SIR of link 1 and thus abandons the transmission of the link 2 to yield the transmission (Tx yielding).

According to the distributed scheduling scheme as described above, the transmission terminal and reception terminal constituting each D2D link, in order to determine whether a medium accesses or not, exchange single-tone signals through resource unit given locally to be only one according to the CID of the link in the Tx and Rx OFDM blocks. In the process, transmission and reception terminals calculate the degree of the signal interference that is expected to have an effect to reception terminals of the D2D links having higher priorities, respectively, and the transmission and reception terminals calculate SIRs that are expected based on the degree of signal interference from transmission terminals of the links, and when the SIRs are equal to or greater than predetermined threshold values ($\gamma_{Tx}$ and $\gamma_{Rx}$), the transmission and reception terminals determine to perform data communication through the medium. Such a SIR-based link scheduling has a significant impact on the strength of the single-tone signal exchanged by transmission and reception terminals.

The effects that occur when adjusting the transmission power by a transmission terminal of a particular D2D link j are shown in Table 1. When the link j adjusts the transmission power upwards, the strength of the reception signal received by a reception terminal of the link j is increased to improve the SIR of the link j, and thus the possibility of performing by the link the Rx yielding due to neighboring D2D links is likely to decrease. On the other hand, in this case, since the effects of the link j on the links having higher priorities than the link j increase, the possibility of performing, by the link j, the Tx yielding to guarantee SIRs of the links as shown in the equation (3) is likely to increase. For the D2D links adjacent to the link j, while the possibility of performing the Rx yielding due to the effect of signal interference from the link j increases, the possibility of guaranteeing the SIR of link j is high so that the possibility of performing the Tx yielding is likely to decrease. When the link j adjusts the transmission power downwards, an adverse effect of the above description occurs.

TABLE 1

| linkj | Yielding possibility | | | |
| --- | --- | --- | --- | --- |
| | Link j | | Adjacent link | |
| transmission power | Tx yielding possibility | Rx yielding possibility | Tx yielding possibility | Rx yielding possibility |
| Transmission power upward adjustment | increase | decrease | decrease | increase |
| Transmission power downward adjustment | decrease | increase | increase | decrease |

As shown in Table 1, the transmission power adjustment in a particular D2D link has an opposite effect on a case of performing a Tx yielding by the link and a case of performing Rx yielding. In addition, the transmission power adjustment for the link may change the Tx and Rx yielding possibility of adjacent D2D links. Therefore, the D2D link transmission power adjustment is required to be done carefully by comprehensively considering not only effects on the link itself but also the effects on the adjacent links. Nevertheless, any method for performing transmission power, if considered only with the state of just D2D link without considering the effect of the transmission power on the SIR-based link scheduling, is difficult to be considered an effective power control. When adjusting the transmission power of the link without considering the effect on the link scheduling result, the performance of the particular link may decrease.

Figure 5:
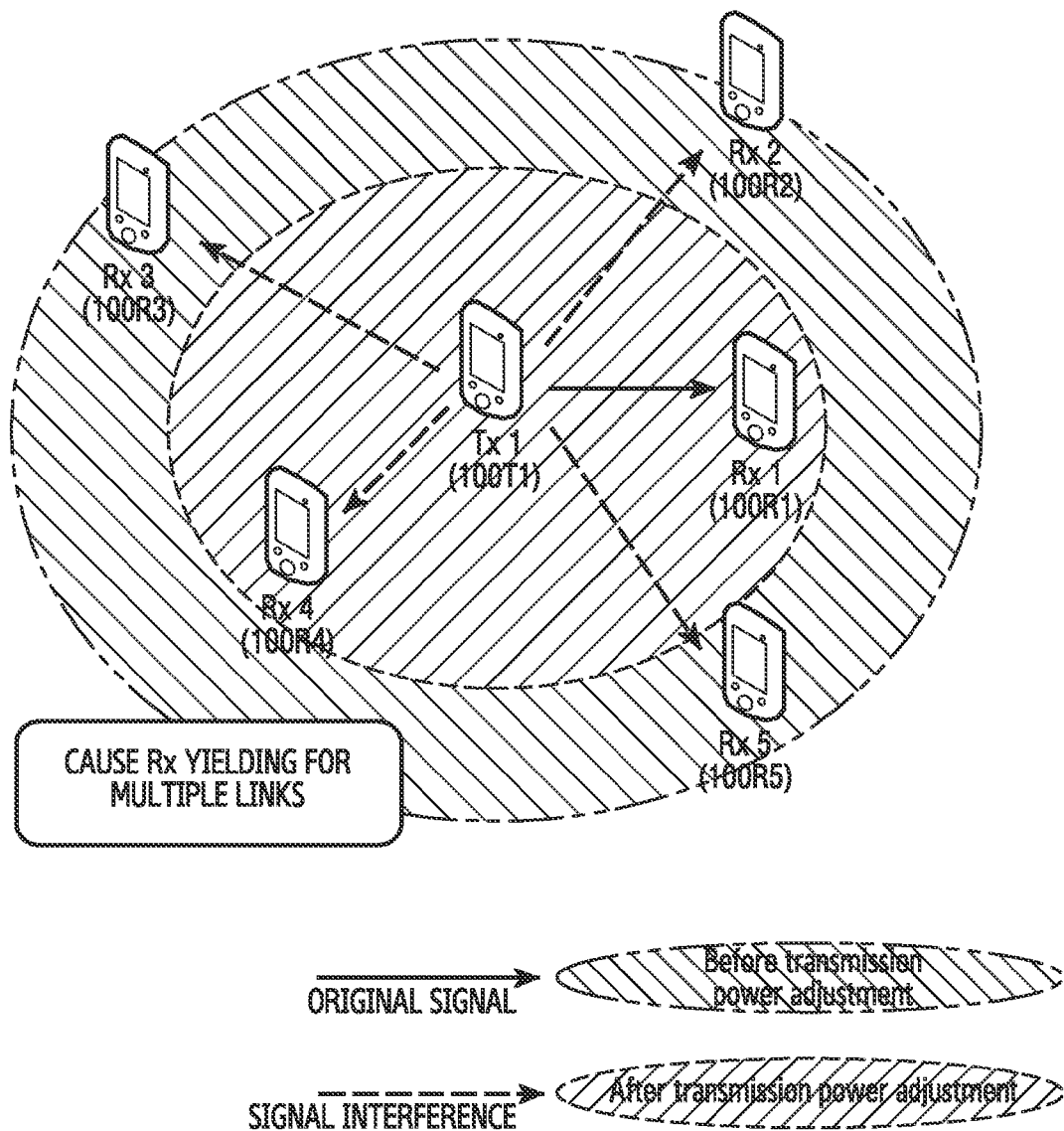
FIG. 5 is a view for explaining that a new transmission power control is required in each of the D2D links of D2D communication network according to the SIR-based link scheduling operation.

FIG. 5 is a view for explaining a new transmission power control which is required in each of the D2D links in a D2D communication network according to an SIR-based link scheduling operation. For the D2D communication network environment, an environment of which all the links use the same transmission power is mainly considered. Under such an environment, a certain D2D link (a link between Tx1 100T1 and Rx1 100R1) causes Tx/Rx yielding for a plurality of other links (links between Tx1 100T1 and Rx2-Rx5 100R2-100R5), and channel capacity due to the SINR decreasing is reduced. Thus, the new power control scheme for the D2D link is required. During power control, it is necessary to consider the problems that the link quality is lowered as power reduces and the capacity of the network increases according to the transmission of another link.

Therefore, as mentioned before, embodiments of the present invention provide a method for effectively adjusting the transmission power of each of the D2D links in a D2D communication network including wireless communication devices. According to embodiments of the present invention, for each link, two indicators representing the effect and degree of Tx yielding and Rx yielding from neighboring links are defined. Embodiments of the present invention propose a method and device in which adjustment may be made by having the transmission power of the D2D link distributed for each link, based on the two indicators, or by having the transmission power of the D2D link centralized through the support of a controller such as a mobile communication base station. A power control method proposed by the embodiments of the present invention has an advantage in that it can effectively improve the performance of the D2D network by controlling the transmission power of each link considering geographic and propagated relations between the D2D links and link scheduling effects.

Embodiments of the present invention which will be described below are applicable to a wireless communication terminal device capable of performing D2D communication. Embodiments of the present invention include: calculating, by D2D links, indicator α indicating a reception (Rx) yielding relation and indicator β indicating a transmission (Tx) yielding relation based on the single-tone signal information interchanged for the link scheduling; and determining a transmission power which each of the D2D links put to a distributed use based on the calculation or determining a transmission power which the D2D links put to a centralized use based on a central controller. Details assumed in the description for the embodiments of the present invention are as follows. First, it is assumed that time and frequency synchronizations are carried out among all the terminals in the synchronization period shown in FIG. 1. Further, for D2D links, the environment of performing the SIR-based link scheduling is based on the traffic slot structure shown in FIG. 2.

B. Yield-Related Indicators

According to embodiments of the present invention, a yield-related indicator is an indicator indicating whether the Tx and Rx yielding occurs or not by neighboring D2D links and the degree of those yields. Yield-related indicator $\alpha_{XY}$ indicates an Rx yielding relation that is received from a neighboring link Y by the link X. Yield-related indicator $\beta_{XY}$ indicates a Tx yielding relation that is transmitted to a neighboring link Y by the link X. These yield related indicators are used as a reference, by a particular D2D link, for determining whether the Tx yielding and Rx yielding occurs or not caused by each neighbor D2D link. For example, when the yield-related indicator $\alpha_{XY}$ is less than 1 ($\alpha_{XY}<1$), the link X performs the Rx yielding caused by a link Y, and when the yield-related indicator $\beta_{XY}$ is greater than 1 ($\beta_{XY}>1$), the link X performs the Tx yielding caused by the link Y. In addition, the yield related indicators are used in the calculation of the power adjustment range of the neighboring D2D links, which are required to not yield for the Tx and Rx by the particular D2D link. For example, a case when a PYnew/PYcurrent is smaller than $\alpha_{XY}$ (PYnew/PYcurrent<$\alpha_{XY}$) corresponds to a condition in which the link X does not allow Rx yielding due to the link Y, and a case when PYnew/PYcurrent is greater than $\beta_{XY}$ (PYnew/PYcurrent>$\beta_{XY}$) corresponds to a condition in which the link X does not allow Tx yielding due to the link Y.

Figure 6:
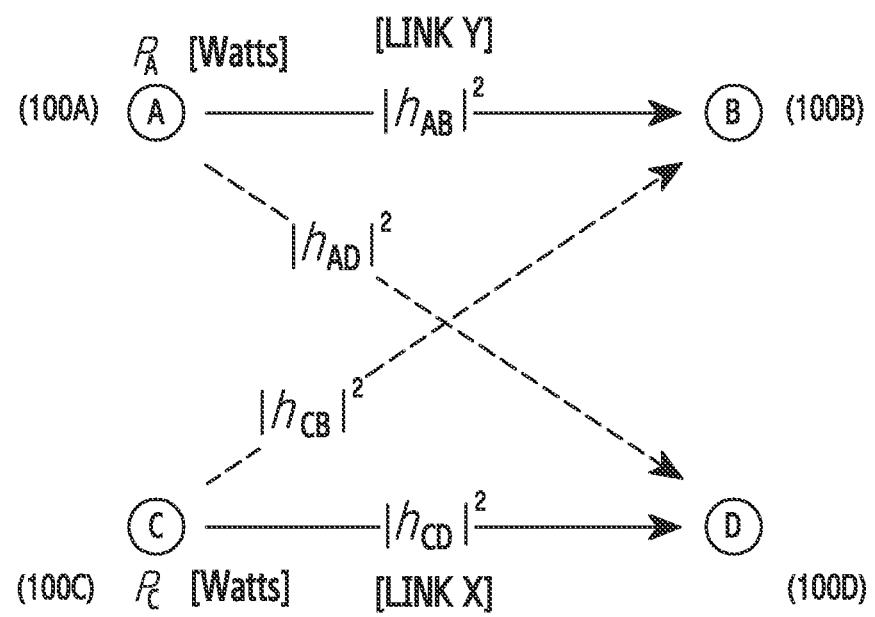
FIG. 6 shows an example of a D2D communication network for explaining the operations of calculating yield related indicators which serve as a reference to transmission power control in a D2D link in accordance with embodiments of the present invention.

FIG. 6 shows an example of a D2D communication network for describing operations for calculating a yield related indicator to be served as a reference for transmission power control in the D2D link in accordance with embodiments of the present invention. A configuration shown in FIG. 6 is only intended for the purpose of illustration, and other embodiments may be used without departing from the scope of the present invention. For example, FIG. 6 shows a D2D communication network including a D2D link X calculating the yield related indicator and a D2D link Y affecting the determination of Tx/Rx yielding or not in the link X. The D2D link Y includes a transmission terminal A 100A and a reception terminal B 100B, and the D2D link X includes a transmission terminal C 100C and a reception terminal D 100D. The strengths of signals transmitted by the current transmission terminal A 100A and the transmission terminal C 100C are denoted by PA [Watt] and PC [Watt], and the wireless channel gain between particular terminals a and b is denoted by $|h_{ab}|^2$.

A yield-related indicator $\alpha_{XY}$ is an indicator indicating whether to perform the Rx yielding by a D2D link Y located adjacent to a certain D2D link X and is an indicator indicating whether to adjust the transmission power at D2D link X or link Y to a certain extent so as not to perform the Rx yield. A procedure for calculating the yield related indicator $\alpha_{XY}$ is as follows. The transmission terminal A 100A and the transmission terminal C 100C of each link, having data to be transmitted in the D2D communication network, select, through the CID allocated to themselves, one of a number of resource units constituting the Tx OFDM block 42A as shown in FIG. 3 of the traffic slot and transmit a single-tone DPS signal through the resource unit. A single resource unit is configured by a single carrier in the frequency domain and a single OFDM symbol in the time domain. The reception terminal D 100D of the D2D link X, which is likely to measure the yield related indicator $\alpha_{XY}$, measures the strength of Direct Power Signal (DPS) transmitted, by the transmission terminals of the adjacent links, through resource units different from each other, by listening to the whole of the Tx OFDM block 42A. At this time, the reception terminal may identify whether the DPS received through each of the resource units has been transmitted by the transmission terminal of the link and what kind of CID the link has, by utilizing the inverse function of the function (such as a hash function) to convert the CID to the position (priority) of the resource unit.

Based on the signal strength of the DPS signal received from the transmission terminal 100A of the D2D link Y, a method for calculating the yield related indicator $\alpha_{XY}$ with the link Y by the reception terminal D 100D of the link X is divided into (1) a method for calculating in view of the power control of the link Y ((perpetrated link), and (2) a method for calculating in view of the power control of the link (damaged link) X.

A method of calculating the yield-related indicator $\alpha_{XY}$ in view of power of the link Y that can cause Rx yielding to link X is as follows. In order to prevent the Rx yielding at the reception terminal D 100D, when it is assumed that the transmission terminal A 100A of the link Y changes their transmission power from $P_A$ [Watt] to $P'_A$ [Watt], SIR of the link X must satisfy the conditions as indicated by equation (4) as follows:

$$\frac{P_C \cdot |h_{CD}|^2}{P'_A \cdot |h_{AD}|^2} > \gamma_{RX} \tag{4}$$

In the above equation (4), when substituting $P'_A \cdot P_A / P_A$ in place of $P'_A$, in order not to cause the Rx yielding at the reception terminal D 100D of the link Y by the transmission terminal A 100A of the link Y, the upper limit of the transmission power adjustment ratio $P'_A/P_A$ of the transmission terminal A 100A can be obtained by equation (5) as follows:

$$\frac{P'_A}{P_A} < \frac{P_C \cdot |h_{CD}|^2}{P_A \cdot |h_{AD}|^2 \cdot \gamma_{RX}} \tag{5}$$

As in the following equation (6), the right-hand side of equation 5 that defines the upper limit of the transmission power adjustment ratio of the transmission terminal A is defined as a yield-related indicator in the embodiments of the present invention.

$$\alpha_{XY} = \frac{P_C \cdot |h_{CD}|^2}{P_A \cdot |h_{AD}|^2 \cdot \gamma_{RX}} \tag{6}$$

A method for calculating a yield-related indicator $\alpha_{XY}$ from the view point of the power of the transmission terminal C of the link (damage link) X is as follows. In order to prevent, by the transmission terminal 100C, the Rx yielding at the reception terminal D 100D due to the signal interference from the link Y, when it is assumed that the transmission terminal C 100C changes its transmission power from $P_C$ [Watt] to $P'_C$ [Watt], an SIR of the link X must satisfy the conditions as indicated by equation (7) as follows:

$$\frac{P'_C \cdot |h_{CD}|^2}{P_A \cdot |h_{AD}|^2} > \gamma_{RX} \tag{7}$$

In the above equation (7), when substituting $P'_C \cdot P_C / P_C$ in place of $P'_C$, in order not to cause the Rx yielding at the reception terminal D 100D, the lower limit of the transmission power adjustment ratio $P'_C/P_C$ of the transmission terminal C 100C can be obtained by equation (8) as follows, and the equation 8 has an inverse form of obtained in equation (6):

$$\frac{P'_C}{P_C} > \frac{P_A \cdot |h_{AD}|^2 \cdot \gamma_{RX}}{P_C \cdot |h_{CD}|^2} = \frac{1}{\alpha_{XY}} \tag{8}$$

The reception terminal D of the link X obtained the Rx yield-related indicator $\alpha_{XY}$ using the procedure as described above, transmits an acknowledgment message to be transmitted to the transmission terminal C 100C in the acknowledgment transmission period 48 shown in FIG. 2, by including $\alpha_{XY}$ value obtained through the procedure. The transmission terminal C 100C that receives the acknowledge message performs the power control (distributed power control) by considering its value, or reports the value to the central controller (centralized power control).

An indicator $\beta_{XY}$ indicating the Tx yielding relationship is calculated through the strength of the IPE signals detected by the transmission terminal in the Rx OFDM block 42B. To calculate $\beta_{XY}$ for the link Y by the transmission terminal C 100C of link X, the Rx OFDM block 42B measures $K \cdot |h_{CB}|^2/(P_A \cdot |h_{AB}|^2)$ [Watt], a strength of the IPE signal received from the reception terminal B. A method for calculating $\beta_{XY}$ on the basis of the measurement, is divided into (1) a method for calculating in terms of power control of the link (perpetrated link) Y, and (2) a method for calculating in terms of power control of the link (damaged link) X.

A method for calculating $\beta_{XY}$ in terms of the power control of the link Y is as follows. When it is assumed that the transmission terminal A 100A of the link Y changes its transmission power from $P_A$ [Watt] to $P'_A$ [Watt], in order to prevent the Tx yielding by the transmission terminal C 100C, an SIR of the link Y predicted by the link X should satisfy the conditions as indicated by equation (9) as follows:

$$\frac{P'_A \cdot |h_{AB}|^2}{P_C \cdot |h_{BC}|^2} > \gamma_{TX} \quad (9)$$

In the above equation (9), when substituting $P'_A \cdot P_A/P_A$ in place of $P'_A$, in order not to cause the Tx yielding at the transmission terminal C 100C by the transmission terminal A 100A of the link Y, the lower limit of the transmission power adjustment ratio $P'_A/P_A$ of the transmission terminal A 100A can be obtained by equation (10) as follows $$\frac{P'_A}{P_A} > \gamma_{TX} \cdot P_C \cdot \frac{|h_{BC}|^2}{P_A \cdot |h_{AB}|^2} \quad (10)$$

In the above equation 10, $|h_{BC}|^2/(P_A \cdot |h_{AB}|^2)$ may be measured by dividing $K \cdot h_{CB}|^2/(P_A \cdot |h_{AB}|^2)$ which is the strength of the IPE signal measured previously, by a system parameter k. In the embodiments of the present invention, in order for the transmission terminal C 100C of the link X to prevent the Tx yielding by the link Y, the lower limit value of power adjustment ratio of the transmission terminal A 100A is defined by equation (11) as follows:

$$\beta_{XY} = \gamma_{TX} \cdot P_C \cdot \frac{|h_{BC}|^2}{P_A \cdot |h_{AB}|^2} \quad (11)$$

A method for calculating the yield-related indicator $\beta_{XY}$ in terms of power of the transmission terminal C 100C link X is as follows. When it is assumed that the transmission terminal C 100C changes the transmission power $P_C$ [Watt] to $P'_C$ [Watt], in order to prevent the Tx yielding by reducing its expected interference amount to be given to the link Y, the SIR of the link Y predicted by the link X must satisfy the conditions defined by equation 12 as follows:

$$\frac{P_A \cdot |h_{AB}|^2}{P'_C \cdot |h_{BC}|^2} > \gamma_{TX} \quad (12)$$

In the above equation (12), when substituting $P'_C \cdot P_C/P_C$ in place of $P'_C$, in order not to cause the Rx yielding at the reception terminal D 100D, the upper limit of the transmission power adjustment ratio $P'_C/P_C$ of the transmission terminal C 100C can be obtained by equation (13) as follows, and the equation 13 has an inverse form of obtained $\beta_{XY}$ in equation (11):

$$\frac{P'_C}{P_C} < \frac{1}{\gamma_{RX}} \cdot \frac{1}{P_C} \cdot \frac{P_A \cdot |h_{AB}|^2}{|h_{BC}|^2} = \frac{1}{\beta_{XY}} \quad (13)$$

The transmission terminals of each of the D2D links per traffic slot, based on $\beta_{XY}$ notified from the reception terminal and $\alpha_{XY}$ directly measured by the transmission terminal itself, form and update a yield relation table as shown in the following Table 2.

TABLE 2

| | D2D link (CID = X) | | |
|---|---|---|---|
| CID | DPS rception signal strength | $\alpha_{XY}$ | $\beta_{XY}$ |
| 1 | 13 dBm | 0.42 | 1.53 |
| 2 | 7 dBm | 1.21 | 0.73 |
| ... | ... | ... | ... |
| MxN | 9 dBm | 0.85 | 2.51 |

The obtained yield related indicators $\alpha_{XY}$ and $\beta_{XY}$ provide upper and lower limits of the transmission power control range for the transmission terminals of the link X or the link Y for avoiding Rx yielding and Tx yielding. In addition, the indicators can be utilized for the purpose of determining whether a particular D2D link X has been experiencing Rx yielding and Tx yielding by the link Y in a current state. In the current state, $P'_A = P_A$ and $P'_C = P_C$, and thus $P'_A/P_A = P'_C/P_C = 1$. When substituting this into equation 5, it is identified whether or not $\alpha_{XY} > 1$ to identify that the link X does not perform the Rx yielding by the link Y. Further, substituting $P'_A/P_A = P'_C/P_C = 1$ into equation 10, it is identified whether $\beta_{XY} < 1$ to identify that the link X does not currently Tx yield by the link Y.

Whether to Rx/Tx yielding of the link X in a current state can be summarized as follows in Table 3, and the power control range to avoid the Tx/Rx yielding of the link X can be summarized as follows in Table 4.

TABLE 3

| | $\alpha_{XY} < 1$ | $\alpha_{XY} > 1$ |
|---|---|---|
| $\beta_{XY} < 1$ | Rx yielding performed Tx yielding not performed | Rx yielding not performed Tx yielding not performed |
| $\beta_{XY} > 1$ | Rx yielding performed Tx yielding performed | Rx yielding not performed Tx yielding performed |

TABLE 4

| | Perpetrated link Y | Damaged link X |
|---|---|---|
| Rx yielding avoidance In link X | $\frac{P'_A}{P_A} < \alpha_{XY}$ | $\frac{P'_C}{P_C} > 1/\alpha_{XY}$ |
| Tx yielding avoidance In link X | $\frac{P'_A}{P_A} > \beta_{XY}$ | $\frac{P'_C}{P_C} < 1/\beta_{XY}$ |

According to an embodiment of the present invention as described above, the reception terminal of the damage link X calculates the yield-related indicator $\alpha_{XY}$ by measuring strengths of the DPS signals transmitted from the neighboring transmission terminals via the Tx OFDM block (42A in FIG. 3A) of every traffic slot (FIG. 2), and the transmission terminal calculates the yield-related indicator $\beta_{XY}$ by measuring strengths of the IPE signals transmitted from the neighboring reception terminals via the Rx OFDM block (42B in FIG. 3A) of every traffic slot (FIG. 2). In this way, each terminal has to observe a large number of traffic slots in calculating yield relation indicators $\alpha_{XY}$ and $\beta_{XY}$ for all neighboring links, and power consumption and delay time depending on the calculation of the yield related indicators may become higher.

Figure 3B:
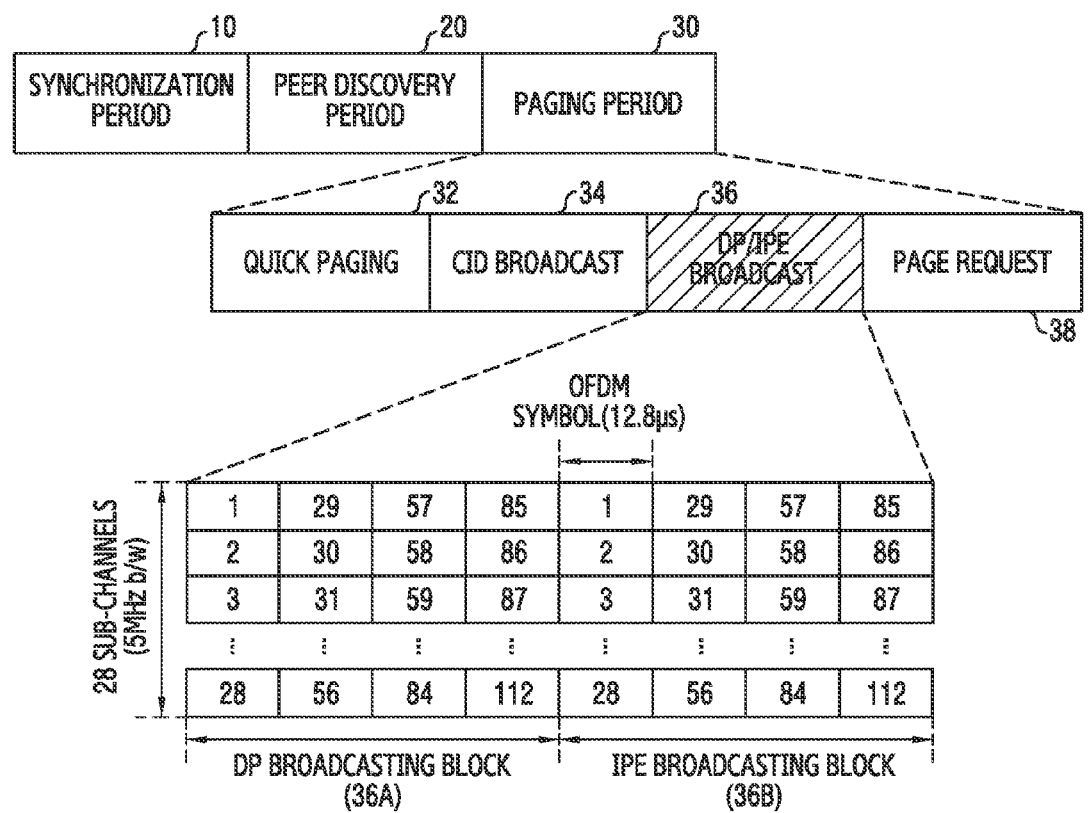
FIG. 3B shows a structure of a paging period shown in FIG. 1.

In order to improve these limitations, another embodiment of the present invention calculates the yield related indicator by using a DP/IPE broadcast period 36 illustrated in FIG. 3B.

Referring to FIG. 3B, a paging period 30 includes a quick paging period 32, a CID broadcast period 34, a DP/IPE broadcast period 36, and a paging request period 38. The DP/IPE broadcast period 36, includes a DP broadcast OFDM block 36A and an IPE broadcast OFDM block 36B. For example, each of the OFDM blocks 36A and 36B includes 28 sub-channels in the frequency plane and four OFDM symbols in the time plane.

All the transmission terminals that have formed the D2D link transmit DP single-tone signals via the transmission unit corresponding to CID (1~112) for its own link by using the transmission power (for example, 20 dBm) basically configured in the DP broadcast OFDM blocks 36A. The reception terminals may calculate yield related indicators $\alpha_{XY}$ for all of the neighboring links by observing the DP broadcast OFDM blocks 36A.

All the reception terminals that have formed the D2D link, transmit IPE single-tone signals via the transmission unit corresponding to CID (1~112) for its own link in the IPE broadcast OFDM blocks 36B. At this time, the strength of the IPE single-tone signal is determined as described above in equation 2. The transmission terminals may calculate the yield related indicator $\beta_{XY}$ for all the neighboring links by observing the IPE broadcast OFDM block 36B.

According to an embodiment of the present invention, a method for adjusting the transmission power on the basis of yield related indicators $\alpha_{XY}$ and $\beta_{XY}$ collected by the transmission terminals of each of the D2D links may be classified into a distributive power control method and a centralized power control method. The distributed power control method is a method for adjusting its transmission power within a predetermined standard based on the $\alpha_{XY}$ and $\beta_{XY}$ information collected by the transmission terminals of each of the D2D links, and the centralized power control method is a method, by a central controller, such as, a mobile communication base station and a repeater, for instructing power control for a specific D2D link on the basis of the yield related indicators collected at each terminal.

C. Centralized Transmission Power Control

Figure 7:
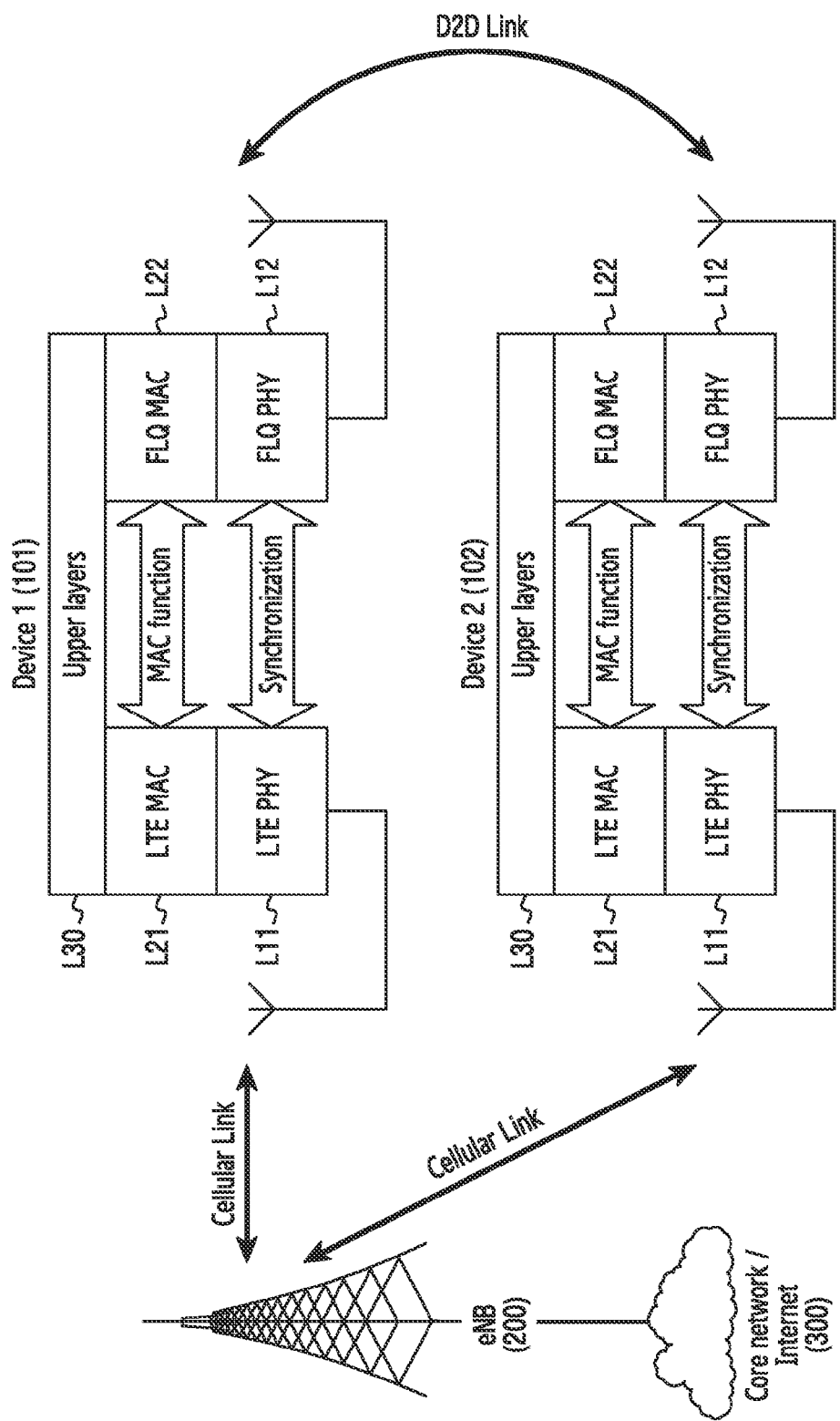
FIG. 7 shows an example of a communication network for centralized power control operation according to the first embodiment of the present invention.

FIG. 7 shows an example of a D2D communication network for centralized power control operation according to an embodiment of the present invention. The configuration shown in FIG. 7 is only intended for the purpose of illustration, and other embodiments may be used without departing from the scope of the present invention.

The D2D communication network includes a device 1 101 and a device 2 102 which are connected via a D2D link. The devices 101 and 102 may be a transmission terminal or a reception terminal, or transmission and reception terminals (not shown) of a neighboring link can be located in the devices 101 and 102. Each of the devices 101 and 102 include a PHY layer unit L12, a MAC layer unit L22, and a higher layer unit L30.

A mobile communication base station (eNB) 200, as a controller to operate the centralized transmission power control, is connected to the devices 101 and 102, according to an embodiment of the present invention. That is, the devices 101 and 102 are connected to the base station 200 via a cellular link. Each of the devices 101, 102 includes the PHY layer unit L11, the MAC layer L21, and an upper layer unit L30, in order to connect to the base station 200. For example, the mobile communication base station 200 may be an LTE base station. The mobile communication base station 200 may be connected to the Internet 300 through a core network.

Figure 8:
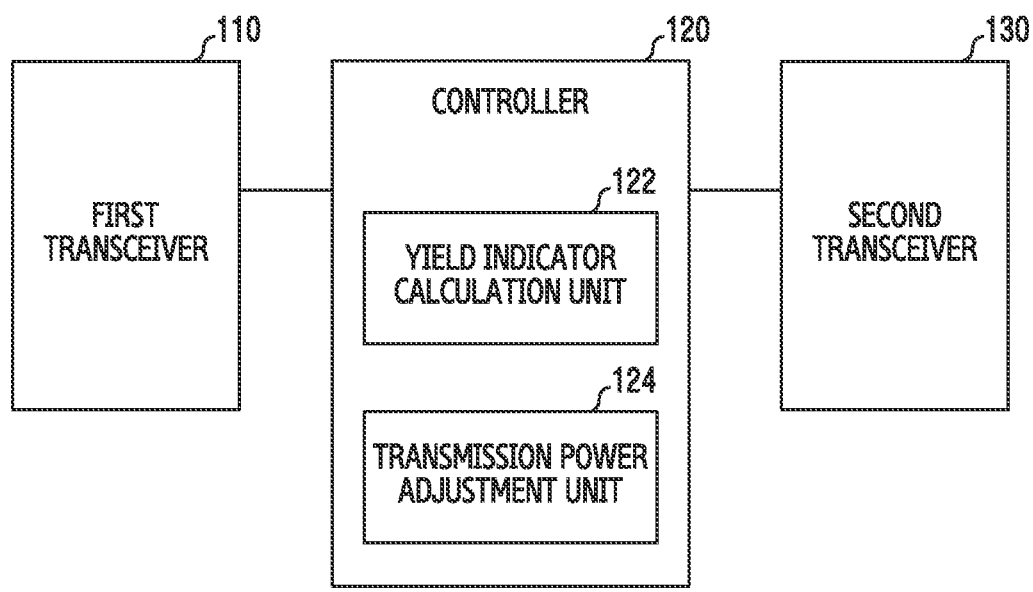
FIG. 8 shows a specific configuration of devices shown in FIG. 7.

FIG. 8 shows a specific configuration of the devices 101 and 102 shown in FIG. 7. The configuration shown in FIG. 8 is only intended for the purpose of illustration, and other embodiments may be used without departing from the scope of the present invention. The devices 101 and 102 include a first transceiver 110, a controller 120, and a second transceiver 130. The first transceiver 110 is for transmitting and receiving a signal through the D2D link. The second transceiver 130 is for transmitting and receiving a signal via a cellular link. The controller 120 controls the overall operation of the devices 101 and 102. In particular, the controller 120 includes a yield indicator calculation unit 122 and a transmission power adjustment unit 124 to the operation according to an embodiment of the present invention.

When the devices 101 and 102 are transmission terminals, the following operations may be performed. The first transceiver 110 receives first detection signals (for example, IPE) transmitted from the reception terminal of the first link (the link itself) and the reception terminal of the second link (neighboring link) and measures the strengths of the received detection signals. The yield indicator calculation unit 122 of the controller 120 determines the yield indicator as the first transmission power adjustment ratio for the transmission terminal of the first link, based on the strengths of the measured first detection signals, so that the signal-to-interference ratio of the second link is equal to or greater than a predetermined threshold value. The first transmission power adjustment ratio may be the upper limit value of the first transmission power adjustment ratio. The transmission power adjustment unit 124 controls the transmission power within the range including the upper limit value of the first transmission power ratio.

In addition, the yield indicator calculation unit 122 determines the yield indicator as the second transmission power adjustment ratio for the transmission terminal of the second link, based on the strengths of the measured first detection signals, so that the signal-to-interference ratio of the second link is equal to or greater than a predetermined threshold value. The second transmission power adjustment ratio may be the lower limit value of the second transmission power adjustment ratio.

In addition, the first transceiver 110 may receive, from the reception terminal of the first link, a control message including a third transmission power adjustment ratio for the transmission terminal of the first link so that the signal-to-interference ratio of the first link is equal to or greater than a predetermined threshold. The third transmission power adjustment ratio is determined based on the measurement result of the strengths of the second detection signals transmitted from the transmission terminals of the first link and the second link. The third transmission power adjustment can be the lower limit value of the third transmission power control ratio. The transmission power adjustment unit 124 may control the transmission power within the range which includes the lower limit value of the third transmission power adjustment ratio.

When the devices 101 and 102 are reception terminals, the following operations may be performed. The first transceiver 110 receives detection signals (for example, DPS) transmitted from the transmission terminals of the first link (the link itself) and the transmission terminals of the second link (neighboring link) and measures the strengths of the received detection signals. The yield indicator calculation unit 122 of the controller 120 determines the yield indicator as the first transmission power adjustment ratio for the transmission terminal of the first link, based on the strengths of the measured detection signals, so that the signal-to-interference ratio of the first link is equal to or greater than a predetermined threshold value. The first transmission power adjustment ratio may be the lower limit value of the first transmission power adjustment ratio. The first transceiver 110 transmits the lower limit value of the first transmission power adjustment ratio to the transmission terminal of the first link so that the transmission terminal of the first link controls the transmission power within the range which includes the lower limit value of the first transmission power adjustment ratio.

In addition, the yield indicator calculation unit 122 determines, based on the strengths of the measured detection signals, a second transmission power adjustment ratio for the transmission terminal of the second link so that the signal-to-interference ratio of the first link is equal to or greater than a predetermined threshold value. The second transmission power ratio can be the upper limit value of the second transmission power adjustment ratio.

Figure 9:
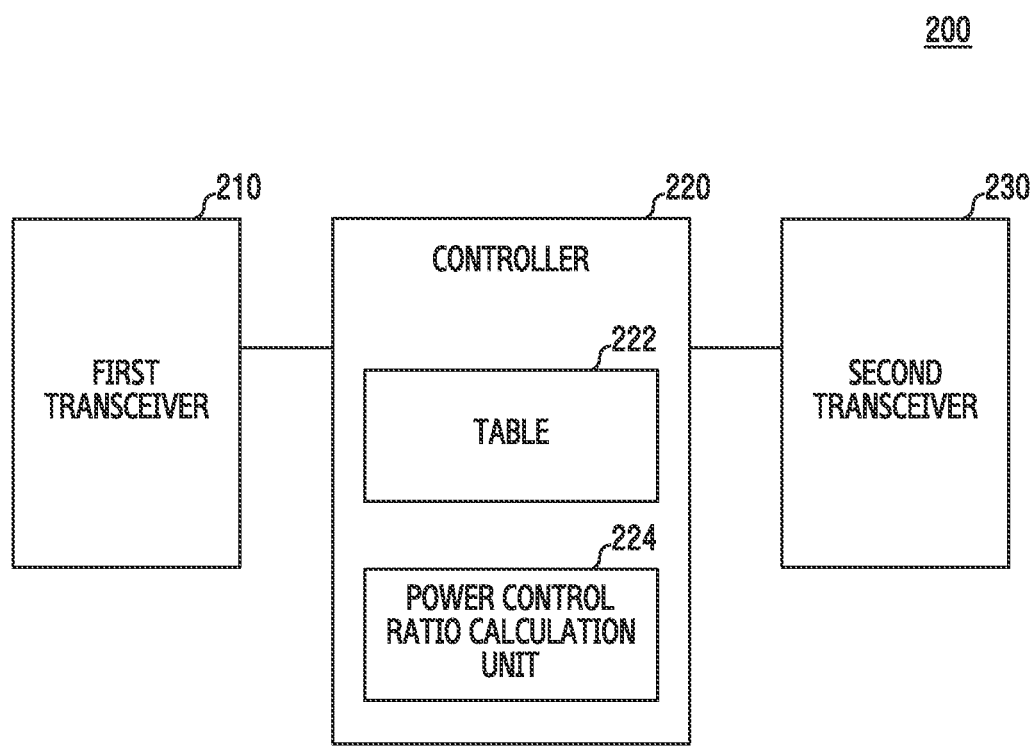
FIG. 9 shows a specific configuration of a base station shown in FIG. 7.

FIG. 9 shows a specific configuration of base station 200 shown in FIG. 7. The configuration shown in FIG. 9 is only intended for the purpose of illustration, and other embodiments may be used without departing from the scope of the present invention. The base station 200 includes a first transceiver 210, a controller 220, and a second transceiver 230. The first transceiver unit 210 is for transmitting and receiving signals to and from the D2D devices 101 and 102. The second transceiver 230 is for transmitting and receiving a signal to and from a core network 300. The controller 220 controls the entire operation of the base station 200. In particular, the controller 220 includes a table 222 and a power control ratio calculation unit 224 for operation according to an embodiment of the present invention.

The first transceiver 210 receives, from respective transmission terminals of D2D links, a control message including a yield indicator to ensure that the signal-to-interference ratio for the link itself and the signal-to-interference ratio of the neighboring links are equal to or greater than a predetermined value. The controller 220 selects a link for transmission power adjustment among from a plurality of links and determines the transmission power adjustment ratio for the transmission terminal of the selected link using the yield indicator included in the control message. The first transceiver 210 transmits the determined transmission power adjustment ratio to the transmission terminal of the selected link. The yield indicator included in the control message includes a reception yield indicator so that a signal-to-interference ratio for its link is equal to or greater than a predetermined threshold value and a transmission yield indicator so that a signal-to-interference ratio of a neighboring link is equal to or greater than a predetermined threshold.

The controller 220 includes a table 222 and a power adjustment ratio calculation unit 224. Table 222 is for storing the transmission and reception yielding related indicators included in the control message received from respective transmission terminals of the D2D links. The power adjustment ratio calculation unit 224 determines the number of neighboring links which cause the transmission yielding and reception yielding for each link, by using the transmission yielding and reception yielding related indicators stored in the table 222, and select a link that is expected to cause the transmission yielding or reception yielding to the neighboring links. For another example, the power adjustment ratio calculation unit 224 selects a link that is expected to cause a lot of transmission or reception yielding to the neighboring link, by using the link quality between the transmission and reception terminals in the respective links. The power adjustment ratio calculation unit 224 determines the transmission power adjustment ratio for the transmission terminal of the selected link, by considering transmission yielding and reception yielding on affected by the selected link, and transmission yielding and reception yielding on received by the selected link.

Figure 10:
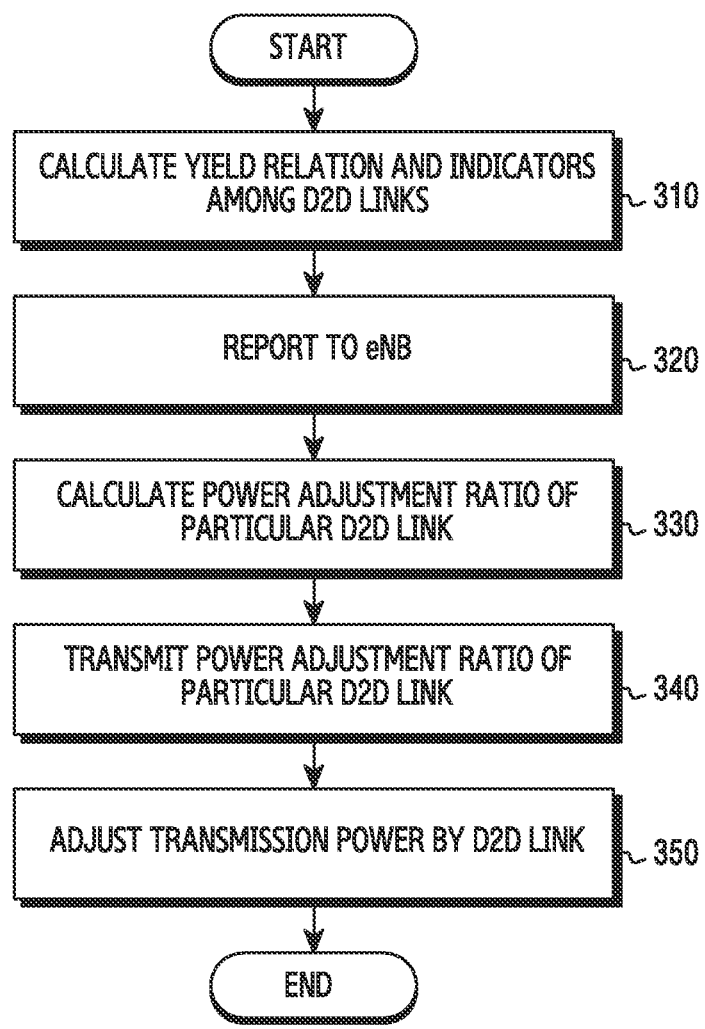
FIG. 10 shows a process flow of a centralized power control operation according to the first embodiment of the present invention.

FIG. 10 shows a process flow of a centralized power control operation in the embodiment. In step 310, the terminal of the D2D link identifies a yield correlation among the D2D links and then represents the yield correlation by indicators. Specifically, the transmission terminal and the reception terminal of the D2D link calculates indicators indicating a Tx/Rx yielding relation with adjacent links and the power adjustment range, based on the reception strength of scheduling signals (DPS and IPE) received at the Tx/Rx block. In step 320, the transmission terminal reports information to be required among the calculated indicators to a base station (eNB) 200. In step 330, the eNB 200 calculates the power adjustment ratio of the specific D2D link. That is, in step 330, the eNB 200 determines a transmission power adjustment ratio for links which have a great effect on the performance, based on the reported indicators. In step 340, the eNB 200 transmits the determined transmission power adjustment ratio to the corresponding link. In step 350, the D2D link adjusts the transmission power according to the received transmission power adjustment ratio.

Figure 11:
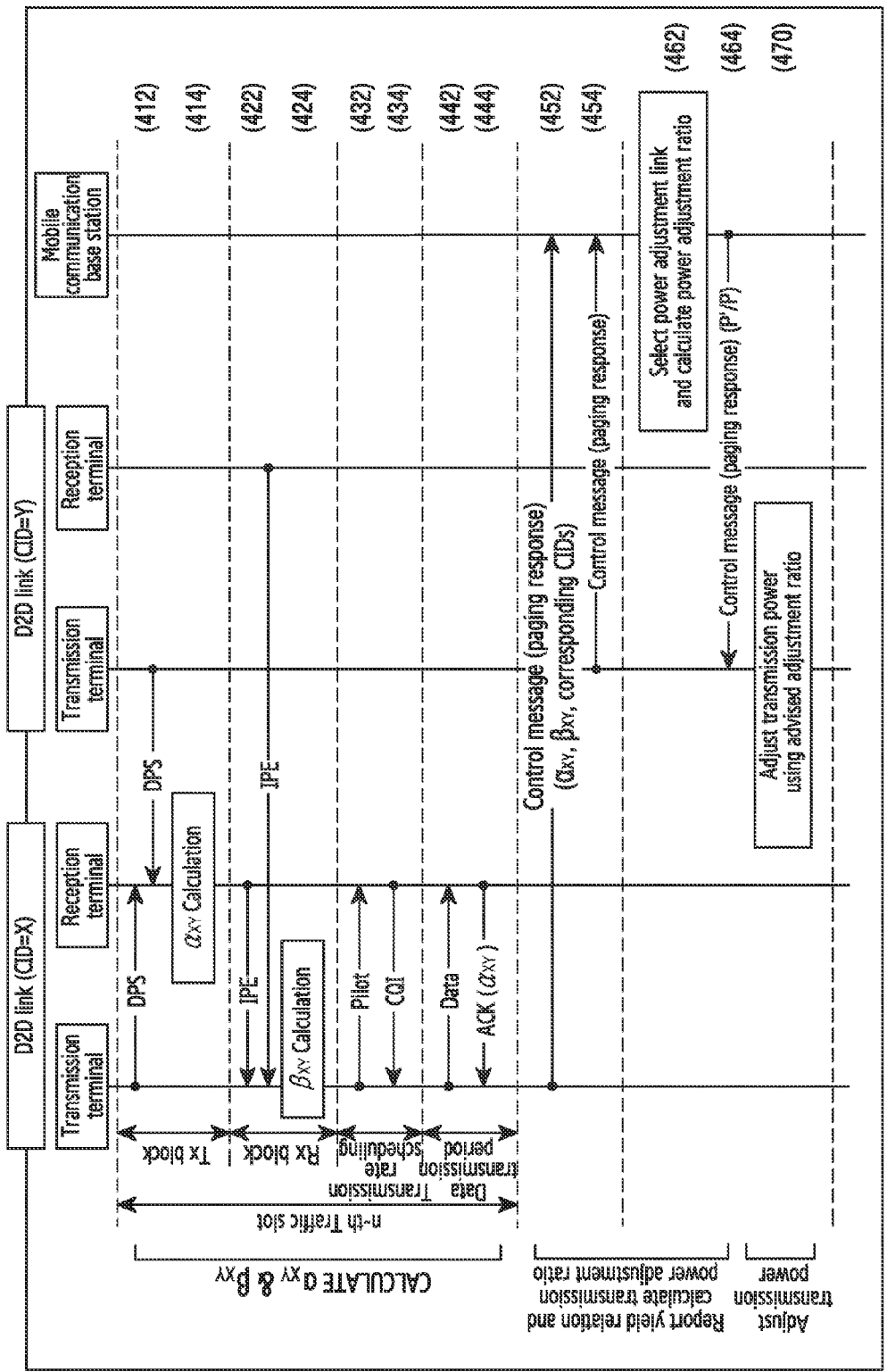
FIG. 11 shows the process flow of centralized power control operation according to the first embodiment of the present invention by elements of a communication network shown in FIG. 7.

FIG. 11 shows a process flow of a centralized power control operation, according to an embodiment of the present invention, by components of the communication network shown in FIG. 7. In this embodiment, an environment is assumed in which the mobile communication base station supports a transmission power control for the D2D links which belong to its communication area.

In step 412, the transmission terminals of the D2D link X and the D2D link Y, having data to be transmitted, transmit the DSP signal through the transmission unit according to a CID given for each Tx OFDM block of the n-th traffic slot. In step 414, the reception terminal of the link X calculates $\alpha_{XY}$ information based on the strengths of the received DPS signals. In step 422, respective reception terminals of two links transmit IPE signals through OFDM transmission units given in the following Rx OFDM block. In step 424, the transmission terminal of the link X calculates $\beta_{XY}$ information based on the strength of the received IPE signal.

In step 432 and step 434, the transmission and reception terminals of the X link, which are to perform a medium access through the exchange of the DPS signal and the IPE signal, determine a modulation scheme and a coding rate to be used in the process of data transmission by exchanging a pilot signal and a channel quality indicator signal. Thereafter, in step 442, the transmission terminal of the link X transmits data to a reception terminal, and in step 444, in a response to step 442, the reception terminal transmits an acknowledge message including previously measured $\alpha_{XY}$ information. The transmission terminal summarizes Table 2, based on the above process. In step 452 and step 454, the transmission terminal reports a control message to the mobile communication base station periodically (e.g., a cellular paging cycle). The control message includes the table information (yield related indicators $\alpha_{XY}$ and $\beta_{XY}$) and the state of the link itself (its own CID, service information being used, link signal quality ($|h|^2$), and the like). For such a report, the transmission terminal may report only the value (yield related indicator $\alpha_{XY}$ and $\beta_{XY}$) to be used in the actual power control, and the congestion of the wireless channel according to the report to the base station by multiple transmission terminals can be prevented. The transmission terminal may transmit the mobile communication paging response message by including the information of the control message.

In step 462, the mobile communication base station, which receives the yield-related information from the transmission terminal of each link, selects a particular link (e.g., link Y) for power control on the basis of such given information and business information in a network, and determines the power adjustment ratio of the selected link. In subsequent step 464, the base station transmits the determined transmission power adjustment ratio (P'/P) to the transmission terminal of the D2D link Y through the control messages (paging messages). In step 470, the transmission terminal of the link Y, which receives the messages, adjusts its transmission power to an advised adjustment ratio.

In the present embodiment, a method for determining the transmission power adjustment ratio of a particular D2D link by a mobile communication base station is as follows. In this embodiment, a method for performing an initial transmission power control by D2D links causing frequent yielding effects on other D2D links is contemplated. To this end, initial adjusting, by the base station, of the transmission power of the D2D link that causes a plurality of Tx yielding to the other links is not good for the link quality because the distance between transmission and reception terminals is far. For the link selected in the above condition, the transmission power adjustment ratio (P'/P) is calculated on the basis of the table received from the D2D links. In this embodiment, the selected link (j) is to minimize the Tx/Rx yielding effect to the adjacent link by reducing its transmission power to be within a range that does not suffer an additional Rx yielding from other adjacent links or that does not cause any additional Tx yielding to the other links and then the selected link (j) determines the transmission power ratio. First, the base station calculates the power adjustment ratio ($\rho_j^{Rx}$) that does not suffer an additional Rx yielding from the adjacent links, because the selected link j decreased the transmission power, as equation (14), on the basis of the equation (8), defined as follows:

$$\rho_j^{Rx} = \max_{k \in S_j^{Rx}} \frac{1}{\alpha_{jk}} \quad (14)$$

In the equation (14), $S_j^{RX}$ is a set of D2D links that do not cause the Rx yielding to the current link j.

Then, the base station calculates the power adjustment ratio ($\rho_j^{TX}$) that does not cause further Tx yielding to the adjacent link as equation (15), on the basis of the equation (10), defined as follows:

$$\rho_j^{Tx} = \max_{i \in S_j^{Tx}} \beta_{ij} \quad (15)$$

In the equation (15), $S_j^{TX}$ is a set of D2D links that do not cause the Rx yielding to the current link j.

Then, the base station determines the transmission power ratio of the link j, that does not suffer an additional Rx yielding from other adjacent links or that does not cause any additional Tx yielding to the other links, as equation (16) defined as follows:

$$\frac{P'}{P} = \min(\rho_j^{Tx}, \rho_j^{Rx}) \quad (16)$$

That is, the base station determines the power adjustment ratio as the one having a smaller value among $\rho_j^{RX}$ and $\rho_j^{TX}$ obtained in equation (14) and equation (15).

The base station updates an $\alpha$ and $\beta$ management table for the D2D links managed by the base station itself. An example of the updated table is shown in FIG. 12A. For example, the values reported by the link 4 are stored in FIG. 12A. The base station selects a power control target link based on the contents of the updated link table 222. For the power adjustment target link, a perpetrated link applying the greatest effects on other links is selected. For example, the link causing the longest Tx or Rx yielding to neighboring terminals is required to preferentially perform the power control, because the impact on the overall performance of the network is large.

Next, the power adjustment ratio calculation unit 224 of the base station calculates the power adjustment ratio Pnew/Pcurrent for the selected link, by utilizing using $1/\alpha$ and $\beta$ management table in accordance with various conditions and purposes. This power adjustment ratio is to reduce the effect on other links by reducing the power, by the selected link j, to the extent that no additional Rx yielding is caused from other links or no additional Tx yielding is caused to the other links. The power adjustment ratio of any link j that does not suffer additional Rx yielding is calculated by the equation (14) discussed before. The power adjustment ratio of any link j that does not cause additional Tx yielding is calculated by the equation (15). Further, the final power adjustment ratio of the selected link is determined as equation (16).

An example of the power adjustment ratio calculation is shown in FIG. 12B. FIG. 12B shows an example for performing a power control for the second link. Through two tables of the $1/\alpha$ and $\beta$ management tables, the power adjustment ratio (0.32) of the link 2 that does not suffer additional Rx yielding and the power adjustment ratio (0.038) of the link 2 that does not cause additional Tx yielding are derived. A smaller power adjustment ratio 0.038 (−14.2 dB), from among the derived power adjustment ratios, is determined as the final power adjustment ratio.

The first transceiver 210 of the base station transmits the power adjustment ratio determined for a selected link to the corresponding link. For example, the determined power adjustment ratio is transmitted by using a periodical cellular paging message.

The controller 220 updates the table 222 being managed on the basis of its report from D2D links received after power adjustment, and continuously performs the power control of the links appropriate for reference.

The transmission terminal of the D2D link received the power adjustment ratio from the base station changes, by using the power adjustment ratio, the transmission power of the single-tone and multi-tone. After changing the transmission power, the transmission terminal reports the updated yield correlation information (indicator) to the base station.

D. Distributed Transmission Power Control

Figure 13:
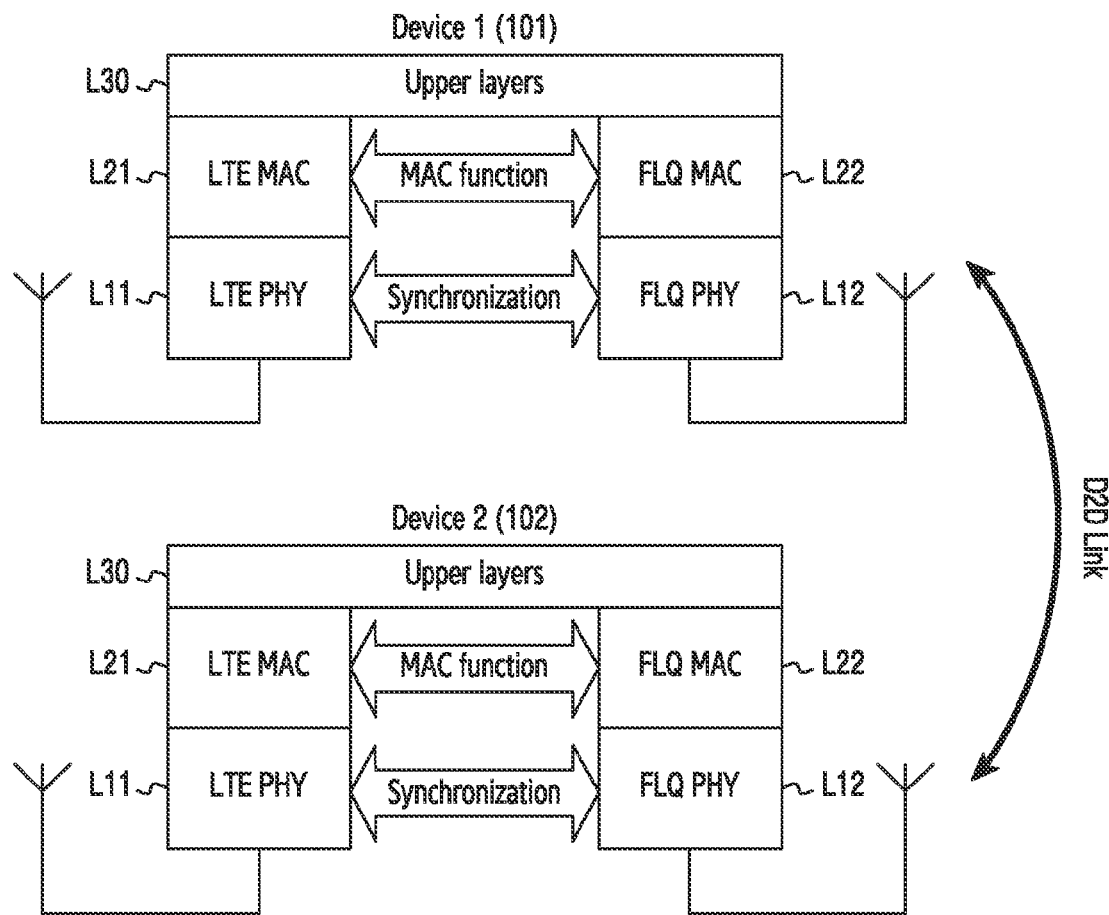
FIG. 13 shows an example of a communication network for a distributed power control operation according to an embodiment of the present invention.

FIG. 13 shows an example of the D2D communication network for distributed power control operation according to an embodiment of the present invention. Configuration shown in FIG. 13 is only intended for the purpose of illustration, and other embodiments may be used without departing from the scope of the present invention.

The D2D communication network includes a device 1 101 and a device 2 102, which are terminals connected via D2D links. The devices 101 and 102 may be a transmission terminal or the reception terminal, or a transmission terminal and a reception terminal (not shown) of the neighboring link can be located in the devices 101 and 102. The devices 101 and 102 individually include a PHY layer unit L12, MAC layer unit L22, and a higher layer unit L30 for D2D communication.

Figure 14:
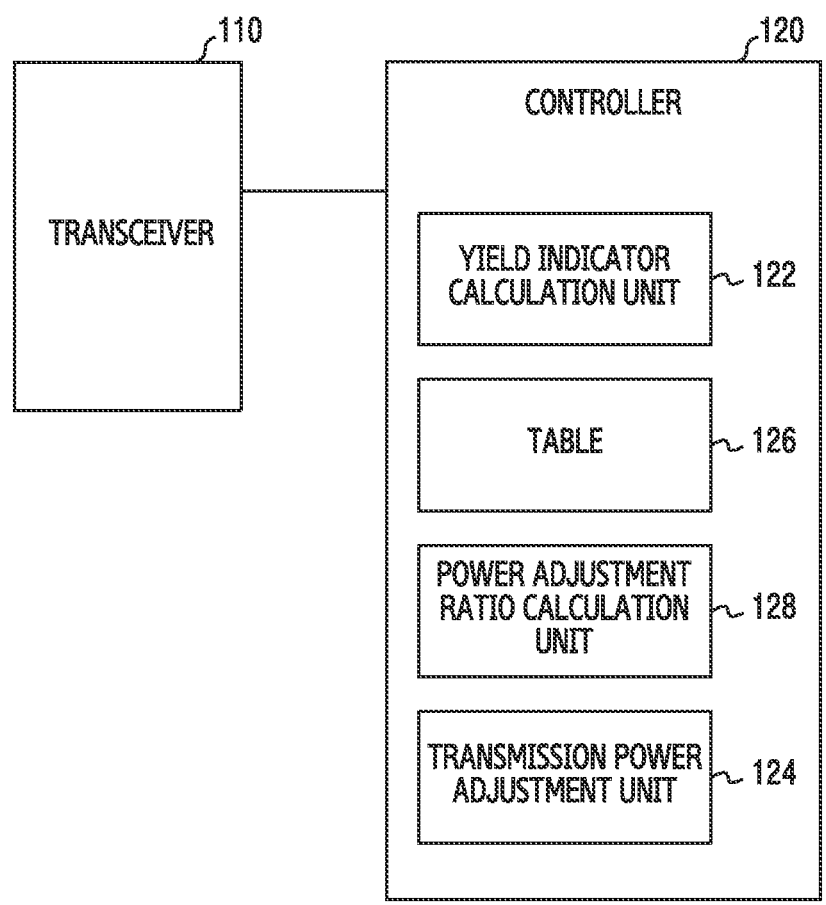
FIG. 14 shows specific configurations of devices shown in FIG. 13.

FIG. 14 shows a specific configuration of the devices 101 and 102 shown in FIG. 13. The configuration shown in FIG. 14 is only intended for the purpose of illustration, and other embodiments may be used without departing from the scope of the present invention. The devices 101 and 102 include a transceiver 110 and a controller 120. The first transceiver 110 is for transmitting and receiving a signal through the D2D link. The controller 120 controls the overall operation of the devices 101 and 102. In particular, the controller 120 includes a yield indicator calculation unit 122, a table 126, the power adjustment ratio calculation unit 128, and a transmission power adjustment unit 124 for operation according to an embodiment of the present invention.

When the devices 101 and 102 correspond to a transmission terminal, the following operations can be performed: The first transceiver 110 receives first detection signals (such as IPE) transmitted from the reception terminals of the first link (the link itself) and the reception terminal of the second link (neighboring links) and measures the strengths of the received detection signals. The yield indicator calculation unit 122 and the power adjustment ratio calculation unit 128 of the controller 120 determine the yield indicators as the first transmission power adjustment ratio for the transmission terminal of the first link, based on the measured strengths of the first detection signals, so that the signal-to-interference ratio of the second link is equal to or greater than a predetermined threshold. The first transmission power ratio can be the upper limit value of the first transmission power adjustment ratio. The transmission power adjustment unit 124 controls the transmission power in the range including the upper limit value of the first transmission power adjustment ratio.

In addition, the yield indicator calculation unit 122 and the power adjustment ratio calculation unit 128 determine the yield indicators as the second transmission power adjustment ratio for the transmission terminal of the second link, based on the measured strengths of the first detection signals, so that the signal-to-interference ratio of the second link is equal to or greater than a predetermined threshold. The second transmission power ratio can be the lower limit value of the second transmission power adjustment ratio.

In addition, the first transceiver 110 may receive, from the reception terminal of the first link, the control message including a third transmission power adjustment ratio for the transmission terminal of the first link so that the signal-to-interference ratio of the first link is equal to or greater than a predetermined threshold value. The third transmission power adjustment ratio is determined based on the measurement result of the strengths of the second detection signals transmitted from the transmission terminals of the first link and the second link. The third transmission power adjustment ratio can be the lower limit value of the third transmission power adjustment ratio. The transmission power adjustment unit 124 may control the transmission power in the range which includes the lower value of the third transmission power adjustment ratio.

When the devices 101 and 102 correspond to a reception terminal, the following operations can be performed: The first transceiver 110 receives detection signals (such as DPS) transmitted from the transmission terminals of the first link (the link itself) and the transmission terminals of the second link (neighboring links) and measures the strengths of the received detection signals. The yield indicator calculation unit 122 and the power adjustment ratio calculation unit 128 of the controller 120 determine the yield indicators as the first transmission power adjustment ratio for the transmission terminal of the first link, based on the measured strengths of the detection signals, so that the signal-to-interference ratio of the first link is equal to or greater than a predetermined threshold. The first transmission power ratio can be the lower limit value of the first transmission power adjustment ratio. The first transceiver 110 transmits the lower limit value of the first transmission power adjustment ratio to the transmission terminal of the first link so as to control the transmission power in the range which includes the lower limit value of the first transmission power adjustment ratio.

In addition, the yield indicator calculation unit 122 and the power adjustment ratio calculation unit 128 determine the second transmission power adjustment ratio for the transmission terminal of the second link, based on the measured strengths of the detection signals, so that the signal-to-interference ratio of the first link is equal to or greater than a predetermined threshold. The second transmission power ratio can be the upper limit value of the second transmission power adjustment ratio.

Figure 15:
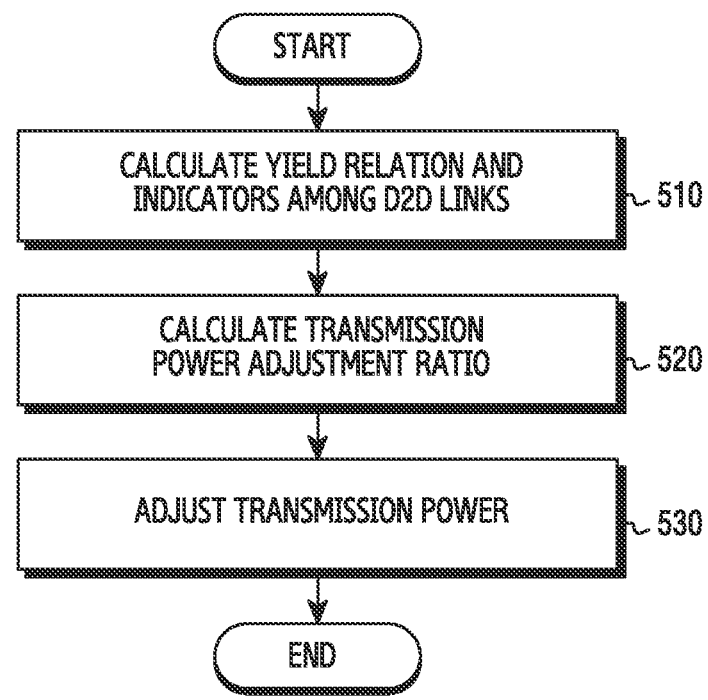
FIG. 15 shows a process flow of a distributed power control operation according to an embodiment of the present invention.

FIG. 15 shows the processing flow of the distributed power control operation according to an embodiment of the present invention. In step 510, the terminals of the D2D link identify the yield correlation between the D2D links and represent the correlation as an indicator. Specifically, the transmission terminal and the reception terminal of the D2D link calculate indicators of indicating the Rx and Tx yielding relation with the neighboring links and power adjustment range on the basis of the reception strength of the signals (DPS, IPE) received from the neighboring links. Since the power control of the link itself must be performed, in which the yield relation of the link is identified, the Rx and Tx yielding related indicators are calculated as shown in equation (2) and equation (4). In step 520, the terminal calculates the transmission power adjustment ratio for their links. Further, the transmission power ratio adjustment of the link is calculated according to the Tx and Rx yielding relation previously identified. There are various adjustments depending on the purpose. In step 530, the terminal adjusts the transmission power of the transmission terminal using the calculated adjustment ratio. For example, single-tone and multi-tone transmission power of the transmission terminal is adjusted by using the calculated adjustment ratio.

Figure 16:
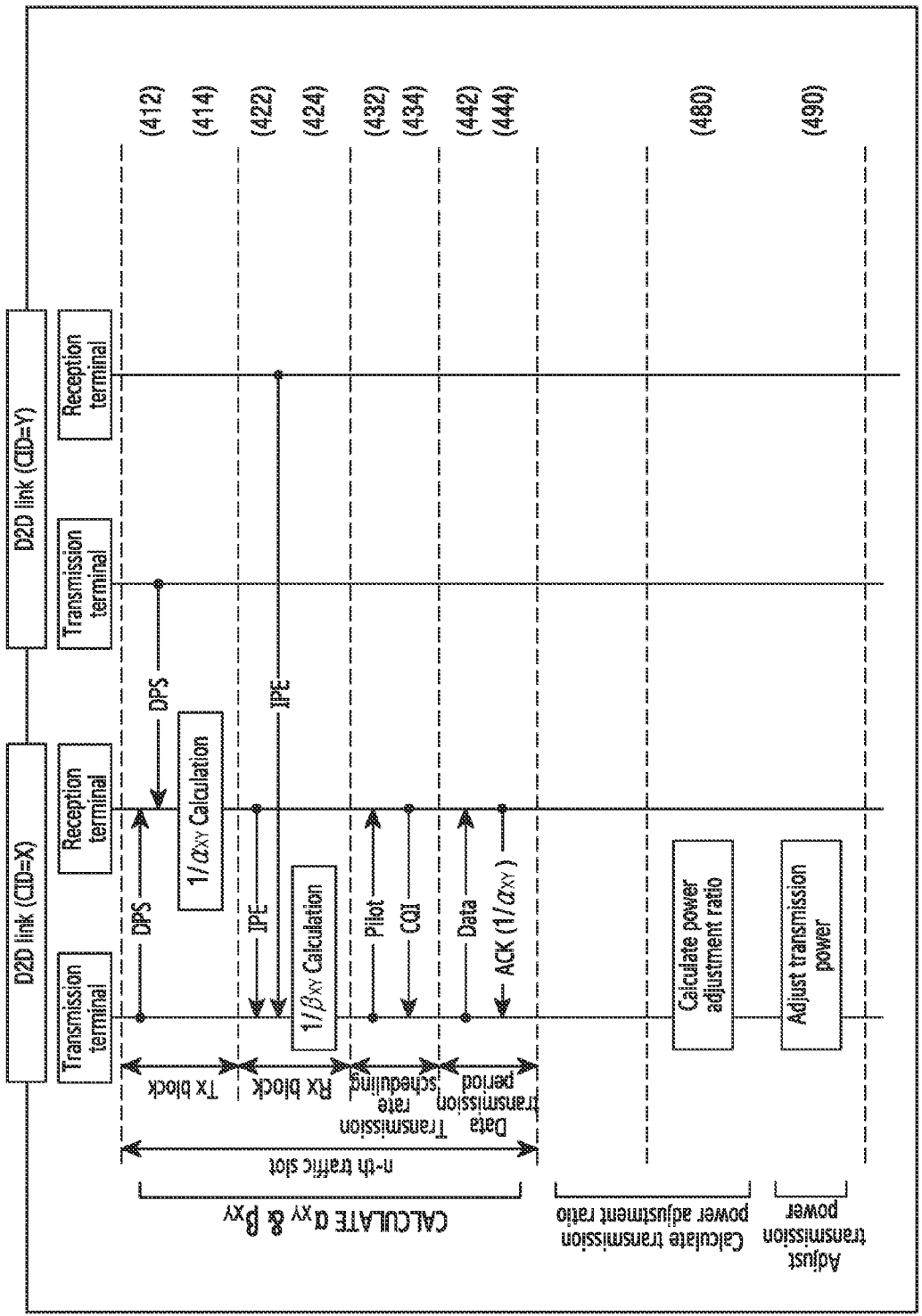
FIG. 16 shows a process flow of a distributed power control operation according to a second embodiment of the present invention by the elements of the communication network shown in FIG. 13.

FIG. 16 shows the processing flow of the distributed power control operation by the components of the communication network shown in FIG. 13, according to an embodiment of the present invention. In this embodiment, an environment is assumed in which the mobile communication base station supports a transmission power control for the D2D link that belongs to its communication area.

In step 412, the transmission terminals of the D2D links X and Y, having data to be transmitted, transmit the DSP signal through the transmission unit according to the CID given to each of the Tx OFDM blocks of the n-th traffic slot. In step 414, the reception terminal of the link X calculates $1/\alpha_{XY}$ information based on the strength of the received DPS signals. In step 422, each reception terminal of two links transmits the IPE signal through the OFDM transmission unit given in the following Rx OFDM block. In step 424, the transmission terminal of the link X calculates $1/\beta_{XY}$ information based on the received IPE signal strength.

In step 432 and step 434, transmission and reception terminals of the link X, which will perform a medium access through the exchange of DPS signal and IPE signal, determine a modulation scheme and a coding rate to be used in the process of data transmission by exchanging pilot and channel quality indicator signals. Thereafter, in step 442, the transmission terminal of the link X transmits data to the reception terminal, and as a response, in step 444, the reception terminal transmits an acknowledgement message including the $1/\alpha_{XY}$ information previously measured.

In step 480, the transmission terminal calculates the transmission power adjustment ratio using the yield related indicators ($1/\alpha_{XY}$, $1/\beta_{XY}$) obtained in advance. Thereafter, in step 490, the transmission terminal adjusts its transmission power using the calculated transmission power adjustment ratio.

The distributed power control operation according to an embodiment of the present invention enhances the transmission power to improve the signal quality of its own link within a range in which the transmission terminal of the specific D2D link X does not suffer additional Tx yielding by neighboring D2D links. The transmission terminal of the D2D link forms a yield-related table for the neighboring D2D links by identifying the neighboring D2D links that do not cause Tx yielding to itself and classifies the links as $S_X^{Tx}$. That is, $S_X^{Tx}$ is a set of links that do not cause the Tx yielding to the D2D link X.

In order to maintain a relation between the links that do not cause Tx yielding and adjust the transmission power, the power control method considers a relation between $1/\beta_{XY}$ and transmission power adjustment ratio $P'_C/P_C$ shown in the equation (13). That is, in order not cause additional Tx yielding, the transmission terminal of the link X should have a low transmission power adjustment ratio lower than $1/\beta_{XY}$ for all the links that do not cause the current yield. To this end, the transmission terminal of the link X determines its transmission power adjustment ratio $P'_C/P_C$ defined by equation (17) as follow:

$$\frac{P'_C}{P_C} = \min_{Y \in S_X^{Tx}} \frac{1}{\beta_{XY}} \quad (17)$$

For the distributed power control method according to an embodiment of the present invention, the link which measures the yield relation should control power so that the yield related indicators $1/\alpha_{XY}$ and $1/\beta_{XY}$ which provide the power control range of the damaged link are calculated.

The yield related indicator $1/\alpha_{XY}$ is calculated by the transmission terminal based on a DSP signal received through the Tx OFDM block from neighboring links. The transmission terminal of the neighboring link that causes the Rx yielding is identified by the calculated yield related indicators. That is, when an indicator $1/\alpha_{XY} > 1$, the link X is Rx yielded by the link Y. The calculated indicator $1/\alpha_{XY}$ is transmitted to the transmission terminal during ACK frame transmission.

The yield related indicator $1/\beta_{XY}$ is calculated by the reception terminal based on an IPE signal received through the Rx OFDM block from neighboring links. The reception terminal of the neighboring link that causes the Tx yielding is identified by the calculated yield related indicators. That is, when an indicator $1/\beta_{XY} < 1$, the link X is Tx yielded by the link Y.

Figure 17A:
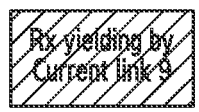
FIG. 17A shows an example of values stored in the table of the devices shown in FIG. 14 during a power control operation according to a second embodiment of the present invention.
Figure 17A:
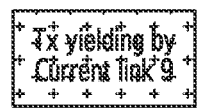

FIG. 17A shows an example of values stored in the tables of the device shown in FIG. 14 during a distributed power control operation according to an embodiment of the present invention. Link 9 is Rx yielded by link 3, link 4, and link 5, and Tx yielded by link 1, link 4 and link 7.

FIG. 17B shows an example of how a power adjustment ratio is calculated from the values stored in the table of the devices shown in FIG. 14 during a distributed power control operation according to an embodiment of the present invention. The purpose of calculating a power adjustment ratio based on the calculated yield related indicator is to increase the link capacity by adjusting the power to be in the range that does not suffer any additional Tx yielding from adjacent D2D links. The transmission power adjustment ratio of the link X is calculated as shown in equation (17). The distributed power control method shown in the embodiment of the present invention is a method for adjusting the power using the yield relation $\beta_{XY}$ which is measured and calculated by the transmission terminal itself in order to improve the signal quality of the link, and it has an advantage in that the performance of the D2D network can be improved through a simple application. In addition, since the power control method supports a distributed power control in each of the D2D links within a range that does break the Tx yielding related to the prior D2D links, a higher performance can be achieved as compared to using a fixed transmission power, or performing a power control considering only the link quality.

Figure 18:
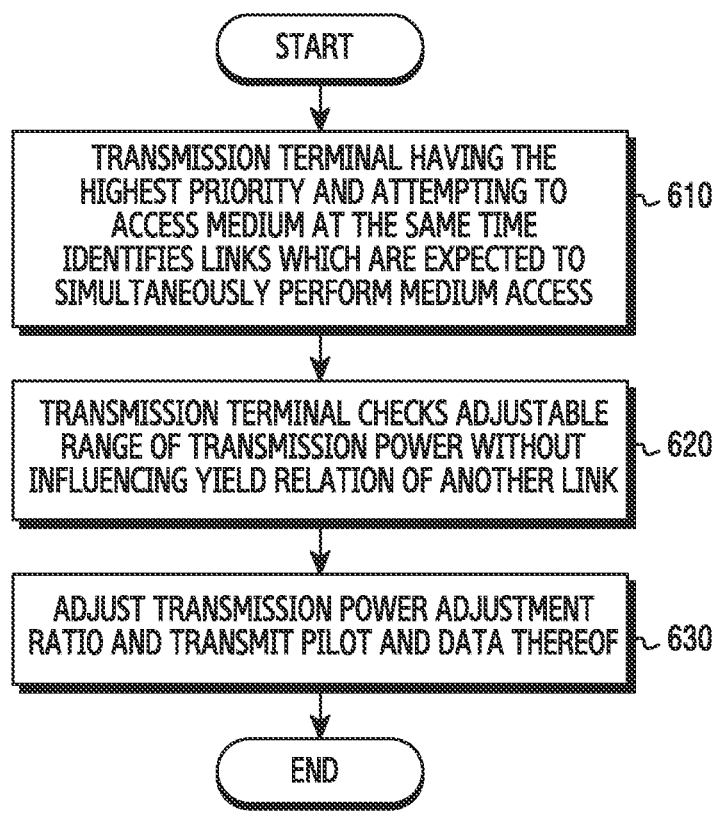
FIG. 18 shows a process flow of a distributed power control operation according to another embodiment of the present invention.

FIG. 18 shows the process flow of the distributed power control operation according to an embodiment of the present invention. Unlike the described embodiment of the distributed power control operation for adjusting the transmission power by considering yield related indicators for all of the neighboring links, regardless of whether the neighboring links access a medium, the embodiment of FIG. 18 enables a performance to be improved by considering only the yield related indicators for links performing actual media access by every traffic slot.

Referring to FIG. 18, a distributed power control method according to another embodiment of the present invention includes: a process 610 of identifying links to be expected to perform a medium access at the same time, by a transmission terminal having the highest priority in the current traffic slot and at the same time attempting to access a medium; a process 620 of identifying, by the transmission terminal, a range that does not affect the yield relation of other links and capable of adjusting the transmission power; and a process 630 of adjusting the transmission power adjustment ratio and transmitting a pilot signal and data according to the adjustment.

A distributed power control method according to another embodiment of the present invention allows only the transmission terminal having the highest priority for every traffic slot and attempting to access the medium at the same time to adjust the transmission power. This is because, for the SIR-based distributed medium access method, the control information exchange is difficult among the links, and another effect may be generated which is different from the case of performing the transmission power control for two or more links.

The process 610 of identifying links expected to perform a medium access at the same time, by a transmission terminal having the highest priority in the current traffic slot and at the same time attempting to access a medium, is performed as follows.

The transmission terminal $Tx_{i^*}$ of a particular link $i^*$ identifies that its link $i^*$ has the highest priority through which the reception terminal $Rx_{i^*}$ of its own link transmits the IPE signal through the highest priority transmission unit among the IPE signals received through the Rx OFDM block (42B of FIG. 3A) of the link scheduling period of the traffic slot. When a yield related indicator $\beta_{ji^*}$ for each neighboring link transmitting the IPE signal is less than 1 (see Table 3), the transmission terminal $Tx_{i^*}$ determines that the neighboring links are the links capable of accessing the medium at the same time with the link itself. The process is repeated for all of the neighboring links so that the transmission terminal $Tx_{i^*}$ calculates a set $S_{MA}^{i^*}$ of neighboring links that may perform the medium access at the same time with the transmission terminal itself.

The process 620 of identifying, by the transmission terminal, a range that does not affect the yield relation of other links and capable of adjusting the transmission power is performed as follows.

The transmission terminal $Tx_{i^*}$ calculates the upper limit $\alpha_{ji^*}^{min}$ of its transmission power adjustment ratio ($\rho_{i^*} = P'_{i^*}/P_{i^*}$) that may not cause the Rx yielding for all of the links that belong to the set $S_{MA}^{i^*}$, defined by equation (18) as follows:

$$\alpha_{ji^*}^{min} = \min_{j \in S_{SRB}^{i^*} - \{i^*\}} \alpha_{ji^*} \quad (18)$$

Here, since links that belong to the set $S_{MA}^{i^*}$ are terminals that do not cause Tx yielding and Rx yielding by the link $i^*$, $\alpha_{ji^*}^{min}$ is greater than 1 (see Table 3).

The process 630 for adjusting the transmission power adjustment ratio and transmitting a pilot signal and data according to the adjustment is performed as follows.

The link $i^*$ has the highest priority in the current traffic slot and thus there is a need to ensure the highest transmission rate. To this end, in the distributed power control method according to an embodiment of the present invention, in order to use the highest transmission power by the transmission terminal $Tx_{i^*}$, the transmission power adjustment ratio defined by equation (19) is determined.

$$\rho_{i^*} = (\alpha_{ji^*}^{min} - \Delta) \quad (19)$$

Here, $\Delta$ is a margin value that does not cause the Rx yielding from the other links due to, for example, the channel effect.

If the new transmission power strength $P_{i^*} \cdot (\alpha_{ji^*}^{min} - \Delta)$ [Watt] according to the transmission power adjustment ratio is less than the maximum transmission power $P_{i^*}^{max}$ [Watt] of the terminal, the transmission terminal $Tx_{i^*}$ transmits a pilot signal and data which will be performed later. On the other hand, if the new transmission power strength $P_{i^*} \cdot (\alpha_{ji^*}^{min} - \Delta)$ [Watt] is greater than the maximum transmission power $P_{i^*}^{max}$ [Watt] of the terminal, the transmission terminal $P_{i^*}^{max}$ transmits a pilot signal and data with the signal strength of $P_{i^*}^{max}$ [Watt].

For $S_{MA}^{i^*} = \phi$, that is, if the terminal itself is to perform a medium access in the traffic slot alone, the transmission terminal $Tx_{i^*}$ configures its transmission power as $P_{i^*}^{max}$ [Watt] and transmits a pilot signal and data with the signal strength of $P_{i^*}^{max}$ [Watt]. This is to maximize the utilization of the wireless channel because the link $i^*$ is the only terminal performing medium access.

E. Evaluation

Figure 19A:
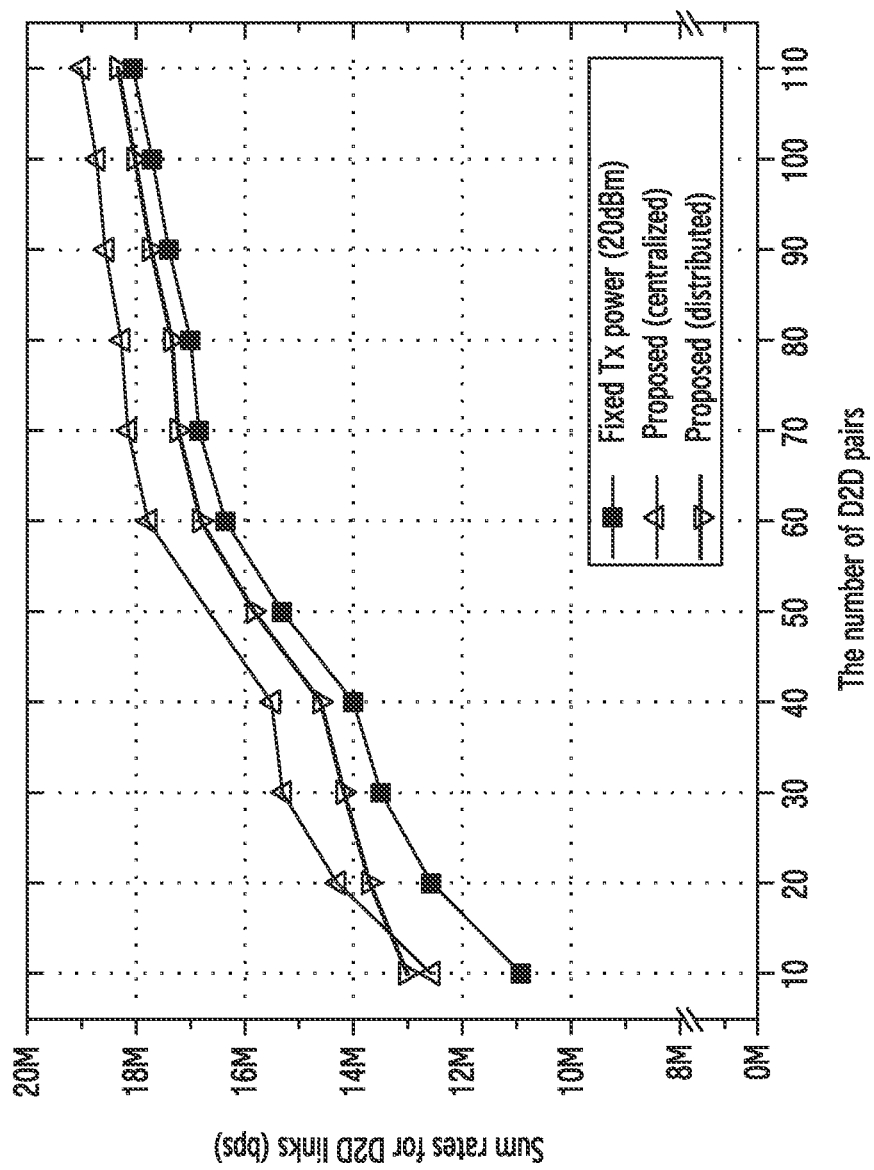
FIGS. 19A to 19C illustrate the performance by comparing power control operations according to embodiments of the present invention.
Figure 19B:
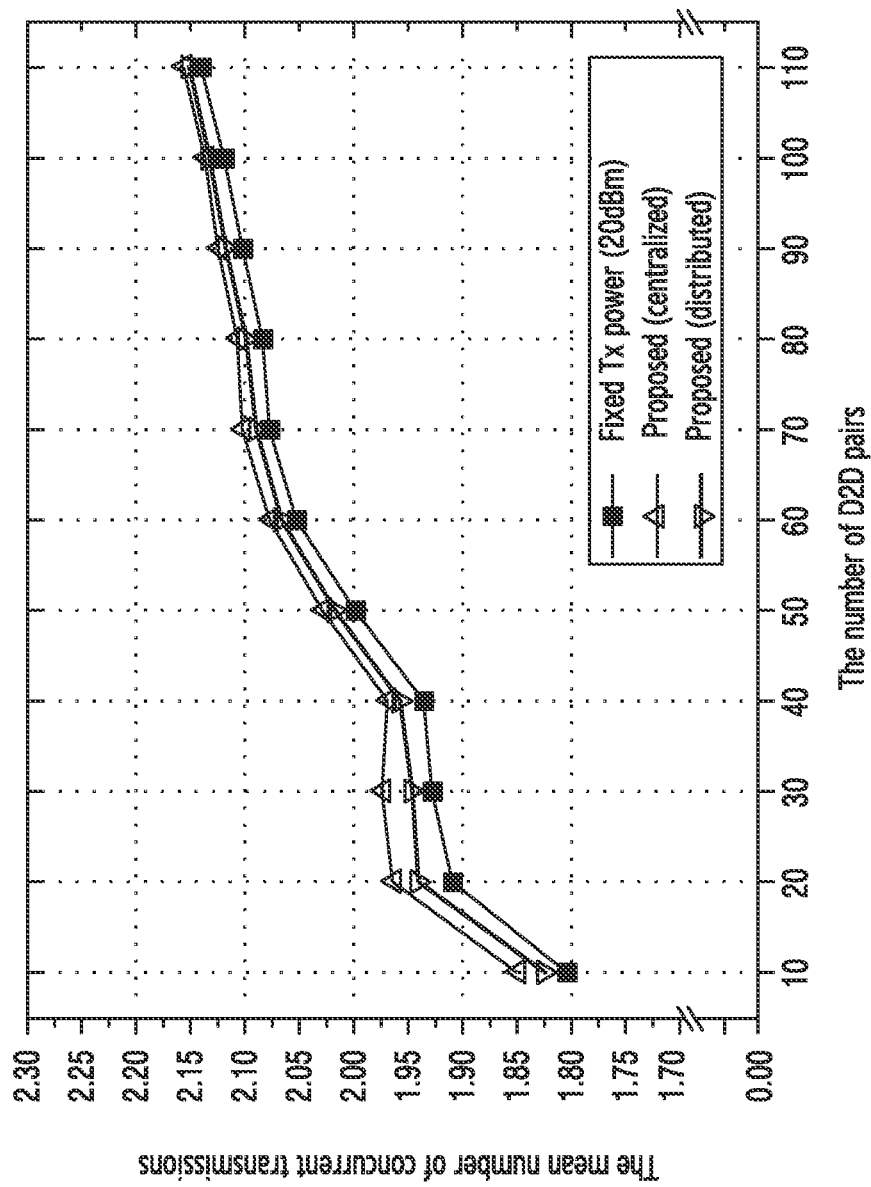
Figure 19C:
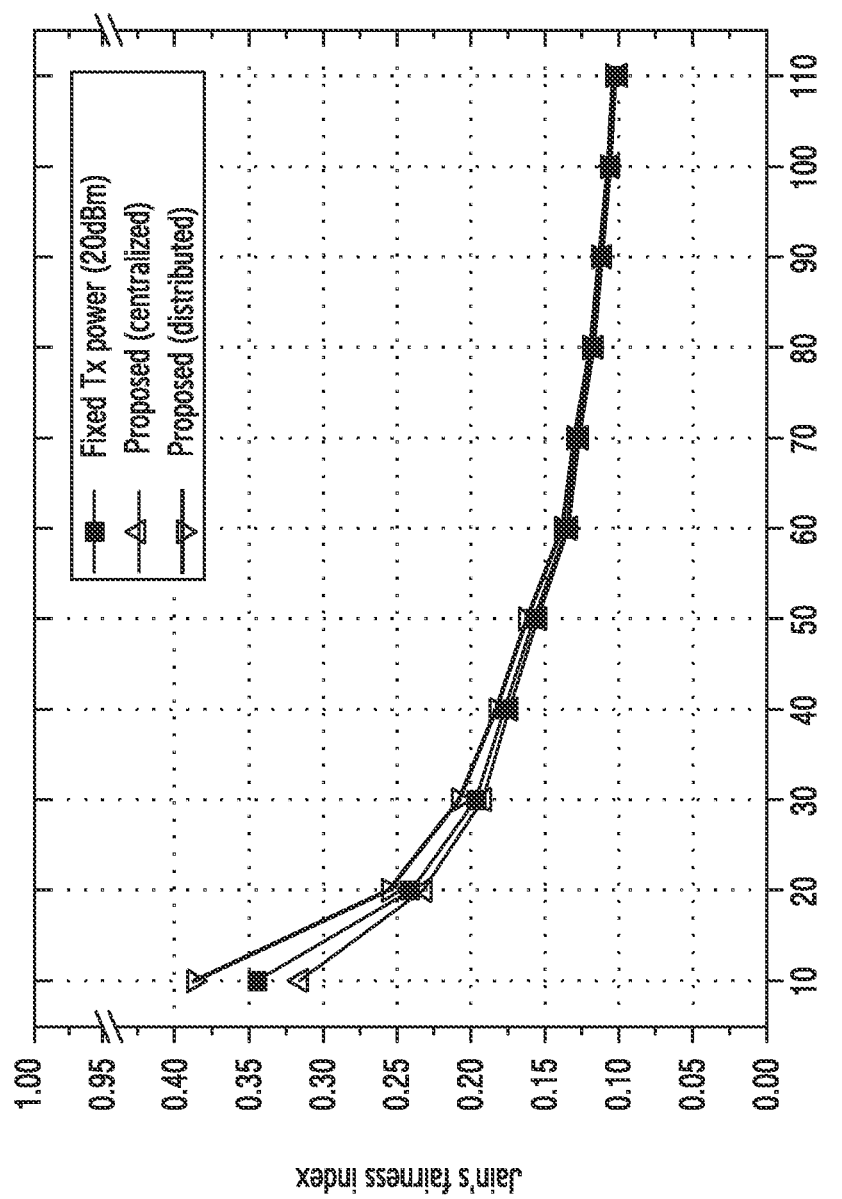

FIGS. 19A through 19C illustrate a performance of the power control operation according to embodiments of the present invention. Existing techniques using the fixed transmission power, a centralized power control operation according to an embodiment of the present invention, and a distributed power control operation according to an embodiment of the present invention are shown in contrast. FIG. 19A illustrates the performance in terms of a total yield (bps) of a network, FIG. 19B illustrates the performance in terms of the average number of simultaneous transmission links, and FIG. 19C illustrates the performance in terms of fairness among terminals.

In this performance evaluation, a network shape is based on the network area of a 1 Km×1 Km square. Terminals were arranged evenly on the network domain, and every 10 seconds, all of the terminals are rearranged. The distance between the terminals in each link was determined to have equal probability to be within [0, 500] m. The roles of the transmission terminal and the reception terminal were determined, and one-way communication was considered from the transmission terminal to the reception terminal. Shading and multipath fading were not considered. For link-specific transmission power, the first links used the transmission power of 20 dBm, the centralized scheme performs power control for the D2D links having a link quality of the bottom 30%, and the distributed scheme performs the distributed power control for all the terminals using the proposed method. Further, a performance evaluation for 1000 seconds was performed.

The yield related indicators in accordance with embodiments of the present invention as described above can be utilized in various ways. For example, the indicators allow the entity which performs centralized control (BS), the neighboring D2D links and the like to know various pieces of information related to the Tx/Rx yielding relation in the particular D2D link. Further, the indicators are used in determining the transmission power adjustment ratio required to maintain and/or improve the Tx/Rx yielding relation. The centralized power control method according to an embodiment of the present invention is capable of systemic control and link managing considering the yield relation among the D2D links. In addition, the centralized power control method according to an embodiment of the present invention can be expanded to various power control techniques utilizing the yield related indicators according to the operators/managers policies. The distributed power control scheme according to the embodiment of the present invention may perform the power control to maintain/improve the current yield relation without an additional coordinator.

Since the embodiments of the present invention as described above control the transmission power by comprehensively considering the effects on the neighboring links as well as their own effect by the respective D2D links in a D2D communication network, and the performance of the entire D2D network can be improved as compared with the case of using the fixed transmission power.

Although the present disclosure has been described above in connection with limited embodiments and drawings, the present disclosure is not limited to the above embodiments, and various modifications and changes may be made thereto from the above description by those skilled in the art to which the present disclosure pertains. According to embodiments of the present disclosure, a program command for performing an operation that is implemented by various computers may be stored in a computer readable medium. The computer readable medium may include a program command, a data file, a data structure, and the like independently or in combination. The program command may be things specially designed and configured for the present invention, or things that are well known to and can be used by those skilled in the related art. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. Examples of the program command include a machine language code generated by a compiler and a high-level language code executable by a computer through an interpreter and the like. When the base station or all or some of the relays disclosed in the present invention are implemented in a computer program, a computer readable medium for storing the computer program is included in the present invention. Therefore, the scope of the present disclosure should not be defined as being limited to the described embodiments, but should be defined by the appended claims and equivalents thereof.

The invention claimed is:

1. A method, which is performed by a transmission terminal of a first link, for controlling transmission power of transmission terminals of links in a device to device (D2D) communication network, the method comprising:
    measuring a strength of a first signal transmitted from a first reception terminal of the first link and a strength of a second signal transmitted from a second reception terminal of a second link; and
    determining a first transmission power adjustment ratio for the transmission terminal of the first link so that a signal-to-interference ratio of the second link is greater than or equal to a predetermined threshold value based on the measured strength of the first signal and the measured strength of the second signal.

2. The method of claim 1, wherein the first transmission power adjustment ratio includes an upper limit value of the first transmission power adjustment ratio.

3. The method claim 1, further comprising:
    determining a second transmission power adjustment ratio for a transmission terminal of the second link so that the signal-to-interference ratio of the second link is greater than or equal to a predetermined threshold value based on the measured strength of the first signal and the measured strength of the second signal.

4. The method of claim 1, further comprising:
    receiving, from the first reception terminal of the first link, a control message including a third transmission power adjustment ratio for the transmission terminal of the first link so that the signal-to-interference ratio of the first link is greater than or equal to a predetermined threshold value,
    wherein the third transmission power adjustment ratio is determined based on a measurement result of a strength of a third signal transmitted from the transmission terminal of the first link and a strength of a fourth signal transmitted from the transmission terminal of the second link.

5. A transmission terminal of a first link for controlling transmission power of transmission terminals of links in a device to device (D2D) communication network, the transmission terminal comprising:
    a transceiver configured to measure a strength of a first signal transmitted from a first reception terminal of the first link and a strength of a second signal transmitted from a second reception terminal of a second link; and
    a controller configured to determine a first transmission power adjustment ratio for the transmission terminal of the first link so that a signal-to-interference ratio of the second link is greater than or equal to a predetermined threshold value based on the measured strength of the first signal and the measured strength of the second signal.

6. The transmission terminal of claim 5, wherein the first transmission power adjustment ratio includes an upper limit value of the first transmission power adjustment ratio.

7. The transmission terminal of claim 5, wherein the controller is further configured to determine a second transmission power adjustment ratio for a transmission terminal of the second link so that the signal-to-interference ratio of second link is greater than or equal to a predetermined threshold value based on the measured strength of the first signal and the measured strength of the second signal.

8. The transmission terminal of claim 5,
    wherein the transceiver is further configured to receive, from the first reception terminal of the first link, a control message including a third transmission power adjustment ratio for the transmission terminal of the first link so that the signal-to-interference ratio of the first link is greater than or equal to a predetermined threshold value, and
    wherein the third transmission power adjustment ratio is determined based on a measurement result of a strength of a third signal transmitted from the transmission terminal of the first link and a strength of a fourth signal transmitted from a transmission terminal of the second link.

9. A method, which is performed by a reception terminal of a first link, for controlling transmission power of transmission terminals of links in a device to device (D2D) communication network, the method comprising:
    measuring a strength of a first signal transmitted from a first transmission terminal of the first link and a strength of a second signal transmitted from a second transmission terminal of a second link; and
    determining a first transmission power adjustment ratio for the first transmission terminal of the first link so that a signal-to-interference ratio of the first link is greater than or equal to a predetermined threshold value based on the measured strength of the first signal and the measured strength of the second signal.

10. The method of claim 9, wherein the first transmission power adjustment ratio includes a lower limit value of the first transmission power adjustment ratio.

11. The method claim 9, further comprising:
    determining a second transmission power adjustment ratio for the second transmission terminal of the second link so that a signal-to-interference ratio of the first link is greater than or equal to a predetermined threshold value based on the measured strength of the first signal and the measured strength of the second signal.

12. A reception terminal of a first link for controlling transmission power of transmission terminals of links in a device to device (D2D) communication network, the reception terminal comprising:
    a transceiver configured to measure a strength of a first signal transmitted from a first transmission terminal of the first link and a strength of a second signal transmitted from a second transmission terminal of a second link; and
    a controller configured to determine a first transmission power adjustment ratio for the transmission terminal of the first link so that a signal-to-interference ratio of the first link is greater than or equal to a predetermined threshold value based on the measured strength of the first signal and the measured strength of the second signal.

13. The reception terminal of claim 12, wherein the first transmission power adjustment ratio includes a lower limit value of the first transmission power adjustment ratio.

14. The reception terminal of claim 12, wherein the controller is further configured to determine a second transmission power adjustment ratio for the second transmission terminal of the second link so that the signal-to-interference ratio of the first link is greater than or equal to a predetermined threshold value, based on the measured strength of the first signal and the measured strength of the second signal.

15. A method, which is performed by a controller device, for controlling transmission power of transmission terminals in a device to device (D2D) communication network which includes terminals of multiple links adjacent to each other and the controller device, the method comprising:
    receiving, from each of the transmission terminals, a control message including a yield indicator so that a signal-to-interference ratio of a link of a terminal transmitting the control message and a signal-to-interference ratio of neighboring links are greater than or equal to a predetermined threshold value;
    selecting a link for a transmission power adjustment from among the multiple links;
    determining a transmission power adjustment ratio for a transmission terminal associated with the selected link using the yield indicator; and
    transmitting the determined transmission power adjustment ratio to the transmission terminal associated with the selected link.

16. The method of claim 15, wherein the yield indicator comprises a reception yield indicator so that the signal-to-interference ratio of the link of the terminal transmitting the control message is greater than or equal to a predetermined threshold value and a transmission yield indicator so that the signal-to-interference ratio of a neighboring link is greater than or equal to a predetermined threshold value.

17. The method of claim 16, wherein the selecting of the link for the transmission power adjustment from among the multiple links, comprises:
    identifying a number of neighboring links which cause transmission yielding or reception yielding for each link using the transmission and reception yielding related indicators, and
    selecting a link that is expected to cause a plurality of transmission yielding or reception yielding to the neighboring links.

18. The method of claim 16, wherein the selecting of the link for transmission power adjustment from among the multiple links, comprises:
    selecting a link that is expected to cause a plurality of transmission yielding or reception yielding to neighboring links using link quality between the transmission terminal and a reception terminal for each link.

19. The method of claim 16, wherein the determining of the transmission power adjustment ratio for the transmission terminal associated with the selected link using the yield indicator, comprises:
    determining the transmission power adjustment ratio for the transmission terminal associated with the selected link in consideration of transmission yielding and reception yielding which the selected link causes and the transmission yielding and the reception yielding which the selected link suffers from.

20. A controller device for controlling transmission power of transmission terminals in a device to device (D2D) communication network which includes terminals of multiple links adjacent to each other and the controller device, the controller device comprising:
    a receiver configured to receive, from each of the transmission terminals, a control message including a yield indicator so that a signal-to-interference ratio of a link of a terminal transmitting the control message and a signal-to-interference ratio of a neighboring link are greater than or equal to a predetermined threshold value;
    a controller configured to select a link for a transmission power adjustment from among the multiple links and determines a transmission power adjustment ratio for a transmission terminal associated with the selected link using the yield indicator; and
    a transmitter configured to transmit the determined transmission power adjustment ratio to the transmission terminal associated with the selected link.

21. The controller device of claim 20, wherein the yield indicator comprises a reception yield indicator so that the signal-to-interference ratio of the link of the terminal transmitting the control message is greater than or equal to a predetermined threshold value and a transmission yield indicator so that the signal-to-interference ratio of the neighboring link is greater than or equal to a predetermined threshold value.

22. The controller device of claim 21, wherein the controller is further configured to:
    identify a number of neighboring links which cause transmission yielding or reception yielding for each link using transmission and reception yielding related indicators, and
    select a link that is expected to cause a plurality of transmission yielding or reception yielding to the neighboring links.

23. The controller device of claim 21, wherein the controller is further configured to select a link that is expected to cause a plurality of transmission yielding or reception yielding to the neighboring links using link quality between the transmission terminal and a reception terminal for each link.

24. The controller device of claim 21, wherein the controller is further configured to determine the transmission power adjustment ratio for the transmission terminal associated with the selected link in consideration of transmission yielding and reception yielding which the selected link causes and the transmission yielding and the reception yielding which the selected link suffers from.

* * * * *